(12) United States Patent
Dunn et al.

(10) Patent No.: US 7,834,819 B2
(45) Date of Patent: Nov. 16, 2010

(54) VIRTUAL FLIP CHART METHOD AND APPARATUS

(75) Inventors: Michael H. Dunn, Dunwoody, GA (US); Ian G. Hutchinson, Suwanee, GA (US); Peter W. Hildebrandt, Duluth, GA (US)

(73) Assignee: Polyvision Corporation, Suwanee, GA (US)

( * ) Notice: Subject to any disclaimer, the term of this patent is extended or adjusted under 35 U.S.C. 154(b) by 1647 days.

(21) Appl. No.: 10/816,537

(22) Filed: Apr. 1, 2004

(65) Prior Publication Data

US 2005/0219225 A1 Oct. 6, 2005

(51) Int. Cl.
*G09G 5/00* (2006.01)

(52) U.S. Cl. .......................... 345/1.1; 715/761

(58) Field of Classification Search .......... 345/1.1, 345/2.1, 3.1, 173, 184, 2.2; 434/408, 411, 434/412, 416, 428; 715/761
See application file for complete search history.

(56) References Cited

U.S. PATENT DOCUMENTS

| | | | |
|---|---|---|---|
| 3,911,218 A | 10/1975 | Takeda | |
| 4,430,526 A | 2/1984 | Brown et al. | |
| 4,451,895 A | 5/1984 | Sliwkowski | |
| 4,495,490 A | 1/1985 | Hopper et al. | |
| 4,503,429 A | 3/1985 | Scjreiber | |
| 4,521,770 A | 6/1985 | Rhyne | |
| 4,538,993 A | 9/1985 | Krumholz | |
| 4,587,568 A | 5/1986 | Takayama et al. | |
| 4,616,336 A | 10/1986 | Robertson et al. | |
| 4,659,876 A | 4/1987 | Sullivan et al. | |
| 4,667,254 A | 5/1987 | Araki et al. | |
| 4,683,468 A | 7/1987 | Himelstein et al. | |
| 4,686,522 A | 8/1987 | Hernandez et al. | |
| 4,715,818 A | 12/1987 | Shapiro et al. | |
| 4,725,829 A | 2/1988 | Murphy | |
| 4,736,407 A | 4/1988 | Dumas | |

(Continued)

FOREIGN PATENT DOCUMENTS

EP 0279558 A1 8/1998

(Continued)

OTHER PUBLICATIONS

Wilkhahn + Hahne GmbH + Co; InterWall.ConsulTable.ConAction range; 12 pages, no date.

(Continued)

*Primary Examiner*—Richard Hjerpe
*Assistant Examiner*—Tom V Sheng
(74) *Attorney, Agent, or Firm*—Quarles & Brady LLP

(57) ABSTRACT

A presentation method and system for presenting information to an audience within a space that mimics a flip chart assembly, the system including a control interface, a communication network and a master presentation unit including a processor and a master display screen, the master screen juxtaposed within the space so as to be viewable by the audience within the space, the processor operable to transmit an image displayed on the master screen over the network upon user command and a slave presentation unit including a slave presenter operable to receive and present an image to the audience within the space that is transmitted by the master unit to the slave unit over the network such that the master unit can be used to create a new image while the first image is simultaneously presented.

89 Claims, 18 Drawing Sheets

U.S. PATENT DOCUMENTS

| | | | |
|---|---|---|---|
| 4,752,773 A | 6/1988 | Togawa et al. | |
| 4,752,893 A | 6/1988 | Guttag et al. | |
| 4,763,356 A | 8/1988 | Day, Jr. et al. | |
| 4,780,821 A | 10/1988 | Crossley | |
| 4,797,106 A | 1/1989 | Umehara et al. | |
| 4,815,029 A | 3/1989 | Barker et al. | |
| 4,893,116 A | 1/1990 | Henderson et al. | |
| 4,897,801 A | 1/1990 | Kazama et al. | |
| 4,939,509 A | 7/1990 | Bartholomew et al. | |
| 4,953,159 A | 8/1990 | Hayden et al. | |
| 4,954,970 A | 9/1990 | Walker et al. | |
| 5,002,491 A | 3/1991 | Abrahamson et al. | |
| 5,008,853 A | 4/1991 | Bly et al. | |
| 5,014,267 A | 5/1991 | Tompkins et al. | |
| 5,018,083 A | 5/1991 | Watanabe et al. | |
| 5,025,314 A | 6/1991 | Tang et al. | |
| 5,027,198 A | 6/1991 | Yoshioka | |
| 5,038,158 A * | 8/1991 | Ayers et al. | 347/55 |
| 5,050,105 A | 9/1991 | Peters | |
| 5,063,600 A | 11/1991 | Norwood | |
| 5,073,926 A | 12/1991 | Suzuki et al. | |
| 5,101,197 A | 3/1992 | Hix et al. | |
| 5,107,443 A | 4/1992 | Smith et al. | |
| 5,119,319 A | 6/1992 | Tanenbaum | |
| 5,146,552 A | 9/1992 | Cassorla et al. | |
| 5,176,520 A | 1/1993 | Hamilton | |
| 5,201,011 A | 4/1993 | Bloomberg et al. | |
| 5,202,828 A | 4/1993 | Vertelney et al. | |
| 5,206,934 A | 4/1993 | Naef, III | |
| 5,208,912 A | 5/1993 | Nakayama et al. | |
| 5,216,755 A | 6/1993 | Walker et al. | |
| 5,239,466 A | 8/1993 | Morgan et al. | |
| 5,271,097 A | 12/1993 | Barker et al. | |
| 5,280,583 A | 1/1994 | Nakayama et al. | |
| 5,293,619 A | 3/1994 | Dean | |
| 5,299,033 A | 3/1994 | Watanabe et al. | |
| 5,299,307 A | 3/1994 | Young | |
| 5,309,555 A | 5/1994 | Akins et al. | |
| 5,339,389 A | 8/1994 | Bates et al. | |
| 5,347,295 A | 9/1994 | Agulnick et al. | |
| 5,375,200 A | 12/1994 | Dugan et al. | |
| 5,392,400 A | 2/1995 | Berkowitz et al. | |
| 5,412,775 A | 5/1995 | Maeda et al. | |
| 5,442,749 A | 8/1995 | Northcutt et al. | |
| 5,448,263 A | 9/1995 | Martin | |
| 5,463,728 A | 10/1995 | Blahut et al. | |
| 5,465,370 A | 11/1995 | Ito et al. | |
| 5,473,737 A | 12/1995 | Harper | |
| 5,502,727 A | 3/1996 | Catanzaro et al. | |
| 5,530,795 A | 6/1996 | Wan | |
| 5,530,880 A | 6/1996 | Katsurabayashi | |
| 5,537,548 A | 7/1996 | Fin et al. | |
| 5,548,705 A | 8/1996 | Moran et al. | |
| 5,579,481 A | 11/1996 | Drerup | |
| 5,596,721 A | 1/1997 | Masse et al. | |
| 5,608,426 A | 3/1997 | Hester | |
| 5,608,872 A | 3/1997 | Schwartz et al. | |
| 5,625,833 A | 4/1997 | Levine et al. | |
| 5,634,018 A | 5/1997 | Tanikoshi et al. | |
| 5,649,104 A | 7/1997 | Carleton et al. | |
| 5,651,107 A | 7/1997 | Frank et al. | |
| 5,671,380 A | 9/1997 | Hidaka | |
| 5,680,636 A | 10/1997 | Levine et al. | |
| 5,704,042 A | 12/1997 | Hester et al. | |
| 5,717,856 A | 2/1998 | Carleton et al. | |
| 5,717,939 A | 2/1998 | Bricklin et al. | |
| 5,748,894 A | 5/1998 | Ishizaki et al. | |
| 5,754,186 A | 5/1998 | Tam et al. | |
| 5,761,419 A | 6/1998 | Schwarz et al. | |
| 5,781,727 A | 7/1998 | Carleton et al. | |
| 5,790,114 A | 8/1998 | Geaghan et al. | |
| 5,790,818 A | 8/1998 | Martin | |
| 5,799,320 A | 8/1998 | Klug | |
| 5,805,118 A | 9/1998 | Mishra et al. | |
| 5,819,038 A | 10/1998 | Carleton et al. | |
| 5,822,525 A | 10/1998 | Tafoya et al. | |
| 5,831,622 A | 11/1998 | Ayala | |
| 5,835,713 A | 11/1998 | FitzPatrick et al. | |
| 5,838,914 A | 11/1998 | Carleton et al. | |
| 5,870,547 A | 2/1999 | Pommier et al. | |
| 5,872,923 A | 2/1999 | Schwartz et al. | |
| 5,889,946 A | 3/1999 | FitzPatrick et al. | |
| 5,892,509 A | 4/1999 | Jakobs et al. | |
| 5,903,252 A | 5/1999 | Ogata | |
| 5,920,694 A | 7/1999 | Carleton et al. | |
| 5,923,844 A | 7/1999 | Pommier et al. | |
| 5,938,724 A | 8/1999 | Pommier et al. | |
| 5,940,082 A | 8/1999 | Brinegar et al. | |
| 5,944,785 A | 8/1999 | Pommier et al. | |
| 5,948,022 A | 9/1999 | Carleton et al. | |
| 5,949,432 A | 9/1999 | Gough et al. | |
| 5,987,376 A | 11/1999 | Olson et al. | |
| 5,995,096 A | 11/1999 | Kitahara et al. | |
| 6,008,804 A | 12/1999 | Pommier et al. | |
| 6,020,863 A * | 2/2000 | Taylor | 345/3.1 |
| 6,047,314 A | 4/2000 | Pommier et al. | |
| 6,061,717 A | 5/2000 | Carleton et al. | |
| 6,084,638 A | 7/2000 | Hare et al. | |
| 6,091,408 A | 7/2000 | Treibitz et al. | |
| 6,115,022 A | 9/2000 | Mayer, III et al. | |
| 6,219,099 B1 | 4/2001 | Johnson et al. | |
| 6,223,212 B1 | 4/2001 | Batty et al. | |
| 6,237,025 B1 | 5/2001 | Ludwig et al. | |
| 6,266,691 B1 | 7/2001 | Watanabe et al. | |
| 6,335,739 B1 | 1/2002 | Matsukura et al. | |
| 6,340,976 B1 | 1/2002 | Oguchi et al. | |
| 6,342,906 B1 | 1/2002 | Kumar et al. | |
| 6,388,654 B1 | 5/2002 | Platzker et al. | |
| 6,411,988 B1 | 6/2002 | Tafoya et al. | |
| 6,560,637 B1 | 5/2003 | Dunlap et al. | |
| 6,567,813 B1 | 5/2003 | Zhu et al. | |
| 6,587,587 B2 | 7/2003 | Altman et al. | |
| 6,594,390 B2 | 7/2003 | Frink et al. | |
| 6,601,087 B1 | 7/2003 | Zhu et al. | |
| 6,608,636 B1 | 8/2003 | Roseman | |
| 6,614,451 B1 | 9/2003 | Hudson et al. | |
| 6,654,032 B1 | 11/2003 | Zhu et al. | |
| 6,662,210 B1 | 12/2003 | Carleton et al. | |
| 6,693,661 B1 | 2/2004 | Vanderwilt et al. | |
| 6,714,172 B2 | 3/2004 | Matsuzaki et al. | |
| 6,724,373 B1 | 4/2004 | O'Neill, Jr. et al. | |
| 6,735,616 B1 | 5/2004 | Thompson et al. | |
| 6,759,997 B2 * | 7/2004 | Someya et al. | 345/1.1 |
| 6,783,252 B1 | 8/2004 | Cambron | |
| 6,901,448 B2 | 5/2005 | Zhu et al. | |
| 6,925,645 B2 | 8/2005 | Zhu et al. | |
| 6,989,801 B2 | 1/2006 | Bruning | |
| 7,006,055 B2 | 2/2006 | Sukthankar et al. | |
| 7,016,935 B2 | 3/2006 | Lee et al. | |
| 7,018,043 B2 | 3/2006 | Castaldi et al. | |
| 7,027,035 B2 * | 4/2006 | Youden | 345/169 |
| 7,046,213 B2 | 5/2006 | Campbell et al. | |
| 7,069,298 B2 | 6/2006 | Zhu et al. | |
| 7,130,883 B2 | 10/2006 | Zhu et al. | |
| 7,134,079 B2 * | 11/2006 | Brown et al. | 715/730 |
| 7,143,134 B2 | 11/2006 | Petrie et al. | |
| 7,170,531 B2 | 1/2007 | Itoh et al. | |
| 7,203,755 B2 | 4/2007 | Zhu et al. | |
| 7,238,231 B1 | 7/2007 | Craig et al. | |
| 7,248,231 B2 | 7/2007 | Hurley et al. | |
| 7,373,605 B2 * | 5/2008 | Schaper | 715/730 |
| 2002/0067318 A1 | 6/2002 | Matsuzaki et al. | |
| 2002/0135536 A1 | 9/2002 | Bruning | |
| 2002/0140675 A1 | 10/2002 | Ali et al. | |

| | | | |
|---|---|---|---|
| 2002/0186236 A1 | 12/2002 | Brown et al. | |
| 2002/0191013 A1 | 12/2002 | Abrams | |
| 2003/0197659 A1 | 10/2003 | Arai | |
| 2003/0222848 A1 | 12/2003 | Solomon et al. | |
| 2004/0024819 A1 | 2/2004 | Sasaki et al. | |
| 2004/0125044 A1 | 7/2004 | Suzuki | |
| 2004/0128354 A1 | 7/2004 | Horikiri et al. | |
| 2004/0252074 A1 | 12/2004 | Schaper | |
| 2005/0052338 A1 | 3/2005 | Suzuki et al. | |
| 2005/0091610 A1 | 4/2005 | Frei et al. | |
| 2005/0093868 A1 | 5/2005 | Hinckley | |
| 2005/0193060 A1* | 9/2005 | Barton | 709/204 |
| 2005/0198141 A1 | 9/2005 | Zhu et al. | |
| 2006/0010392 A1 | 1/2006 | Noel et al. | |
| 2006/0048058 A1 | 3/2006 | O'Neal et al. | |
| 2007/0065096 A1 | 3/2007 | Ando et al. | |

FOREIGN PATENT DOCUMENTS

| | | | |
|---|---|---|---|
| JP | 61288655 | 12/1986 | |
| JP | 61279268 | 8/1987 | |
| JP | 2001217977 | 8/2001 | |
| JP | 2003031079 A | 1/2003 | |
| WO | WO 01/31397 A1 | 3/2001 | |

OTHER PUBLICATIONS

Request for Restriction/Election, mailed Nov. 3, 2009, for U.S. Appl. No. 11/585,752.

Non-Final Rejection, mailed Feb. 22, 2010, for U.S. Appl. No. 11/585,752.

Request for Restriction/Election, mailed Nov. 26, 2008, for U.S. Appl. No. 11/446,019.

Non-Final Rejection, mailed Apr. 15, 2009, for U.S. Appl. No. 11/446,019.

Final Rejection, mailed Dec. 2, 2009, for U.S. Appl. No. 11/446,019.

* cited by examiner

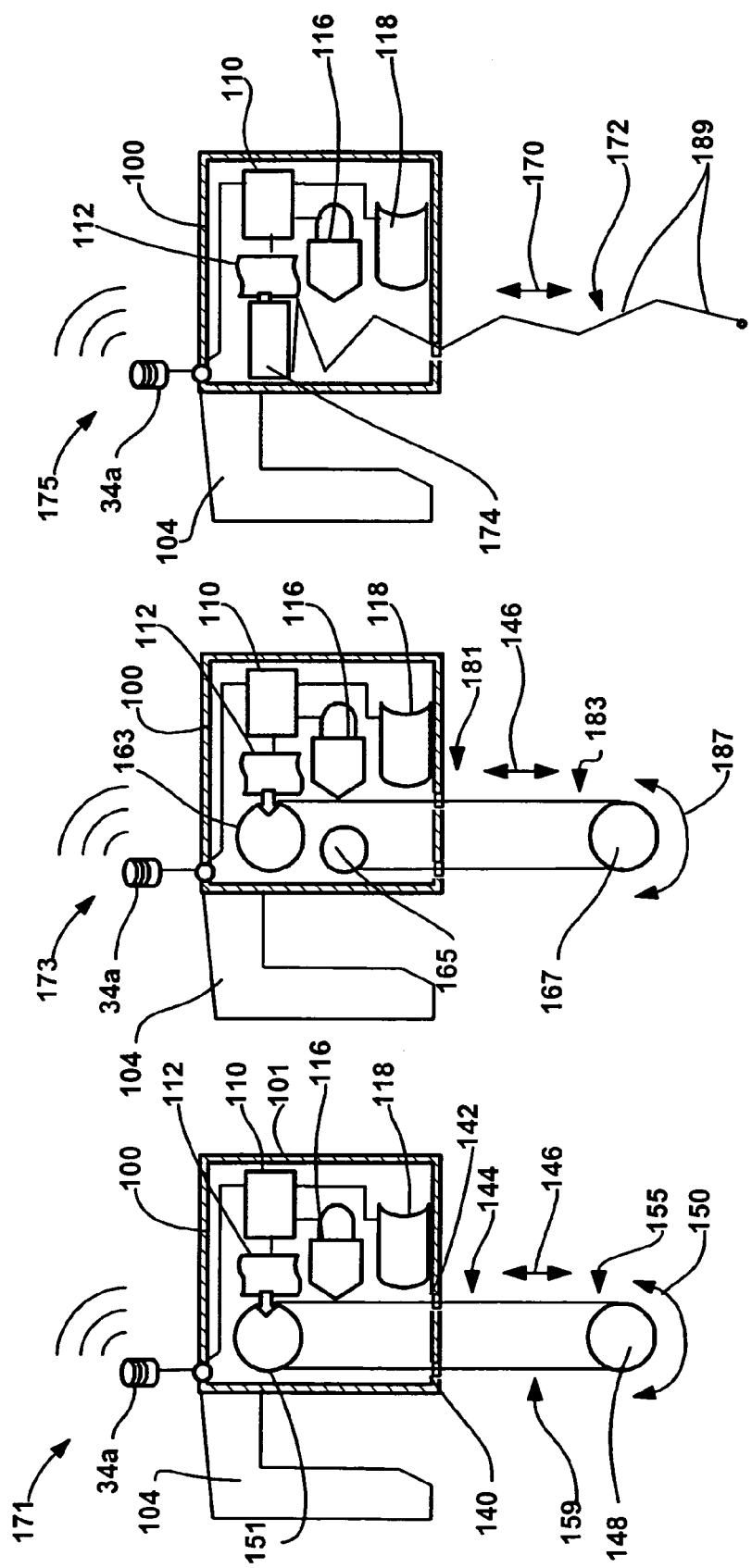

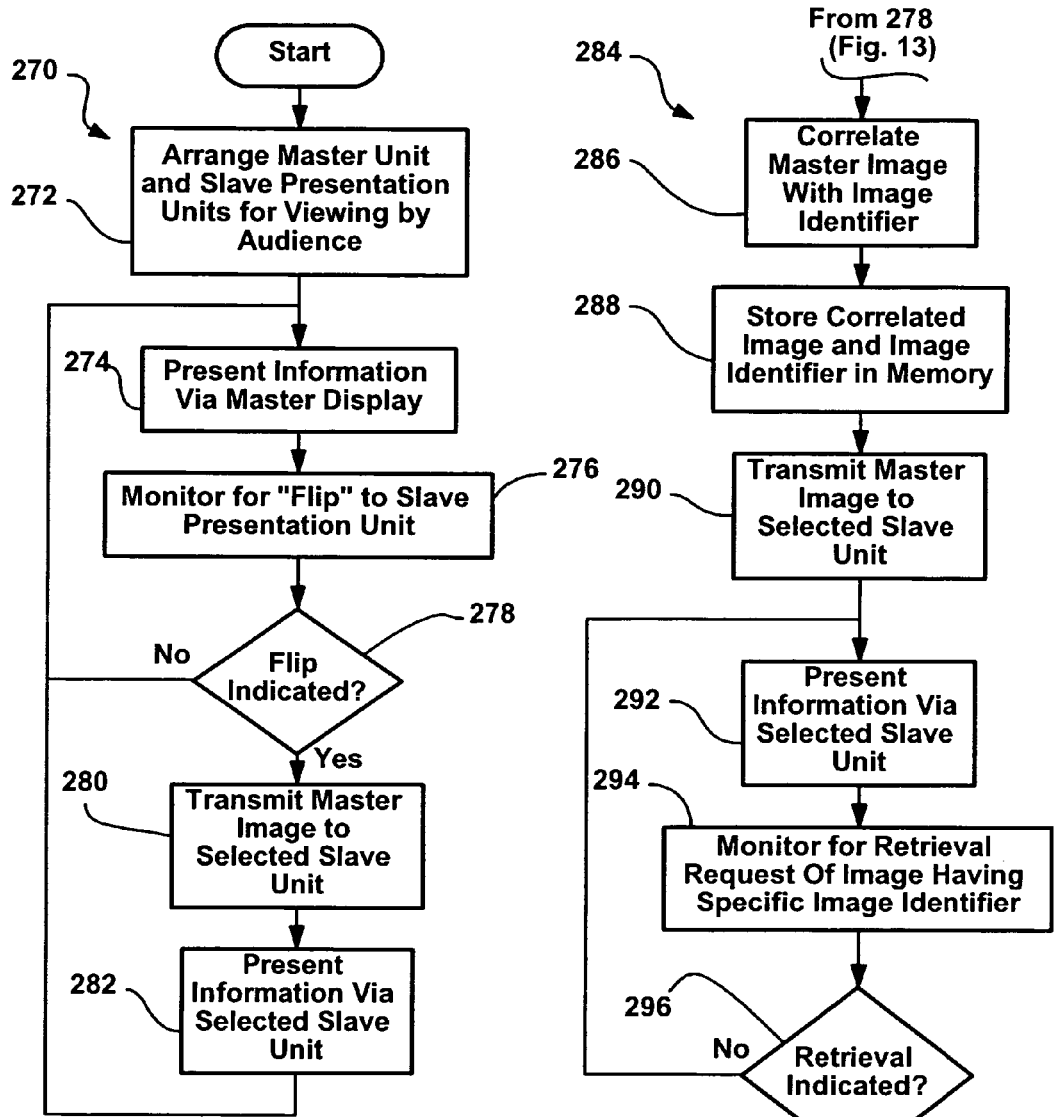

VIRTUAL FLIP CHART METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The field of the invention is information presentation systems and more specifically presentation systems that enable interactive information presentation to an audience within a conference room or the like where information is presented in a manner akin to conventional paper type flip charts that can be dynamically edited in a collaborative fashion.

Various tools have been developed to help people in a conference type environment to share information and exchange ideas efficiently. For instance, widely used tools include chalk boards, writable/erasable whiteboards (e.g., dry-erase or dry wipe) and the like where information can be presented in a large format to an audience within a conference room, a class room, etc. One advantage of whiteboards and chalkboards is that information presented thereon can be modified or augmented so that information can be dynamically altered to reflect current thoughts thereby facilitating collaborative activity. Hereinafter, while boards and other tools are useable for various types of activities including single person presentations as well as collaborative activities, in the interest of simplifying this explanation, unless indicated otherwise, all types of information sharing activities will be referred to generally as "collaborative activities".

While erasable boards are suitable for certain collaborative activities, erasable boards typically have several shortcomings. To this end, when a clear presentation surface is required and therefore information currently thereon is erased, in most cases there is no way to continue to present the erased information in front of the audience so that the erased information as well as the newly applied information can be simultaneously viewed. In addition, in most cases, there is no way to archive erased information for subsequent presentation when using an erasable board. Moreover, in many cases (e.g., chalkboards or large whiteboards) erasable boards are either not portable (e.g., are mounted to a wall) or are difficult to transport (e.g., may be mounted on wheels to transport within a facility but may only rarely be transported outside a facility to another facility due to their size.

One other commonly used collaborating tool that overcomes some of the limitations of conventional erasable boards is a paper type flip chart. A typical flip chart resembles a large pad of paper typically mounted to an easel or the like and bound along a top edge. The easel is usually placed at the front of a room in which collaborative activity is to occur. In the case of a flip chart, information is applied to a top sheet of a pad as concepts are developed. When a new concept is to be developed, a top sheet including applied information is either torn along the top edge and is removed or is flipped over the top of the pad (hence the label "flip chart") to reveal a new clean top sheet on which additional information can be applied.

Where a sheet is torn off a pad after information is applied thereto, in cases where the information to be applied to the new clean top sheet is related to the information on the sheet removed, the removed sheet may be posted on a wall or other generally vertical supporting structure adjacent the flip chart at the front of the room in which the presentation takes place so that information on both the top sheet and the removed sheet can be viewed simultaneously by the audience. Often sheets are posted via tape strips or tacks. In most cases flip charts and associated easels are portable.

Thus, flip charts are advantageously portable and can be used to present a large amount of information by removing and posting sheets within audience view. In addition, when desired, flip chart sheets can be stored in a folder or the like to archive collaborative information and to facilitate subsequent access.

One major drawback to flip charts is that the flipping or paper removing activities as well as the posting activities are both visibly and audibly (i.e., paper flipping and tearing machinations are noisy) distracting to audience members. This is particularly true where an information presenter herself has to flip, tear and/or post sheets between information presentation which results in pauses during collaborating activity.

In addition, where a presenter posts sheets quickly so as to minimize the pause in collaborating activity, often sheet edges are misaligned and/or become crinkled, frayed and/or at least partially rolled at ends resulting in a sloppy presentation that further reduces presentation/collaboration effectiveness.

Moreover, in most cases non-erasable pens are used to apply information to flip chart sheets and therefore, while information can be added to sheets, information typically cannot be removed from sheets once added. Thus, where a flip chart user wants to provide a sheet that includes only part of the information appearing on an existing sheet, the user typically has to create a new sheet including only the desired information and foregoing the other information.

Furthermore, while information can be added to a flip chart sheet while posted (e.g., a sheet removed from the easel and mounted to a wall), often the topology of a wall behind a posted sheet is unsuitable for supporting the sheet during application of information (i.e., the wall surface may be contoured). Thus, when information is to be added to a posted sheet, often the sheet has to be removed from the support wall and remounted to the easel after which the information is added. Thereafter, the sheet has to be removed from the easel and reposted on the wall a second time. This sheet shuffling activity, like the tearing and initial posting activity, is distracting and time consuming.

Yet another problem with typical flip charts is that, while sheets used during collaborative activity can be saved for subsequent reference, typical chart sheets are relatively large (e.g., 3×5 feet) and therefore, either a large storage space is required to store the sheets or the sheets have to be folded to be accommodated in a smaller storage space (e.g., a file drawer). Where sheets are folded for storage, while the sheets remain available for subsequent reference and reposting for subsequent viewing by an audience, the folds often reduce the effectiveness of subsequent presentation.

One more problem with typical flip charts is that collaborative activities often yield information that is considered confidential by persons participating in the activities. Here, when collaborative activities are interrupted for some reason, ideally, posted flip charts are blocked or removed from general view in some way so as to maintain the information thereon confidential from people in the vicinity of the activity space. This is particularly true where collaborative activities are interrupted for hours, days or even weeks. Here, where posted pages are removed from supporting structure and stowed until activities are resumed, ideally, upon resuming a session, the stowed pages are re-posted in the same relative juxtaposition that the pages were in when the session was interrupted to aid session participants in re-orienting trains of thought. Storing pages during an interruption in an organized manner and re-posting the pages in their previous juxtapositions is tedious and time consuming. This is particularly true in cases when sessions yield a large number (e.g., 10 or more) of posted pages where relative juxtaposition may be difficult to remember.

To address some of the problems discussed above, other systems have been developed that combine electronics and a board surface (e.g., a whiteboard, flat panel display screen, etc.) so that information presented on the board surface can be stored for subsequent access and/or presentation. For example, in some cases a digital camera may be provided that, upon command, takes and stores a digital picture of a whiteboard surface. Here, a letter sized copy of the digital picture can be printed for storage or distribution. As another example, in some cases systems are provided that can track pen tip and eraser movement on a whiteboard surface and that can generate representations of the pen and eraser movements and digitally store the representations for subsequent access and/or printing (in this regard see U.S. patent application Ser. No. 10/452,178 which is titled "Electronic Whiteboard" and which is incorporated herein by reference in its entirety).

As one other example, in some systems pen and eraser type instrument movements adjacent a whiteboard surface are tracked and a projector projects an image indicative of the instrument activity onto the board surface (i.e., a pen movement appears on a projection screen as a line that follows the movement of the pen tip, all projected marks within the swath of an eraser instrument are erased from the projected image, etc.). Here, either in real time or when instructed to, a processor stores the image projected onto the board surface in a database. At a subsequent time the stored image can be retrieved from storage and re-presented via the projector and board surface. Similar systems have been provided using flat panel displays (e.g., plasma, LCD, etc.) and touch sensitive projection screens.

While the electronically enhanced assemblies described above overcome many of the problems associated with erasable boards, unfortunately the assemblies cannot be used in a flip chart fashion to present large amounts of information via several sheets or presentation structure akin thereto. Thus, even where information consecutively presented via an electronically enhanced system is related and simultaneous presentation of the information would result in collaborative synergies, only one screen image can be viewed and augmented at a time.

Some electronically enhanced systems have been developed that allow an information presenter to preview, edit and direct images to be presented to an audience via two or more large screens. For instance, in some cases an information presenter can use a podium mounted display device to view and edit slides or pre-stored images during a presentation and prior to presenting the images to an audience. Here, a processor may provide controls to the presenter via the podium mounted display to, when an image is selected to be presented to the audience, identify which of two or more large screens to send the selected image to. For instance, where first and second large screens are located behind a podium and to the left and right of the podium, respectively, the controls may enable the presenter to select one of the left or right large screens on which to present the image.

Despite advantages of image previewing/directing systems like the one described above, even these systems have shortcomings. For instance, while the podium mounted display is useable to edit an image prior to presentation to an audience, the podium mounted display is specifically juxtaposed so that the audience cannot see the information presented thereon. Thus, the podium mounted display is not useable in a collaborative fashion as is the top sheet of a flip chart.

In addition, in known systems like the one described above, presented images have to be digitally stored separately for archive purposes. Thus, for instance, where a system includes ten large screens, separate images are displayed on each of the large screens and a group using the system decides to break for the day intending to resume collaborative activity the next day, each of the ten images has to be stored separately prior to turning off the system and has to be retrieved separately the following day.

Moreover, the next day when the ten separately stored images are retrieved to resume the activities, in order to pick up where the previous days session ended, the retrieved images have to be presented via the exact same large screen units used to present the images the previous day to avoid confusion. This process of retrieving and presenting images in the proper spatial order would be tedious at best.

In at least some cases other drawbacks associated with systems that include two or more large screens and a podium based preview display are the size of the overall system and associated complexity of setting up the system. Thus, for instance, where each of the large screens includes a screen and a projector, movement of the systems between different venues may be cumbersome or, in some cases, entirely impractical.

BRIEF SUMMARY OF THE INVENTION

In general, the present invention includes a master presentation unit and one or more slave presentation units that can be used to mimic the advantageous aspects of a conventional paper pad type flip chart in both visual presentation characteristics as well as the manner in which a system operator interacts with the master and slave units. To this end, generally, a system operator uses the master unit in a collaborative fashion with an audience located in a conference room, class room, on a factory floor, or the like, to present concepts and develop ideas dynamically via a master display screen that is observable to each of the operator and the audience at the same time. Thus, for instance, the operator may use a stylus or virtual ink pen to draw an image on the master display screen in front of the audience and may use a virtual ink eraser type tool to remove portions of the image in a collaborative fashion.

After a diagram has been completed on the master display screen, the operator can use interactive tools provided by the master unit or some other type of interacting device to "flip" the completed diagram from the master display screen to any one of the slave presentation units thereby mimicking the process of tearing a top page of a flip chart pad of paper from a pad and posting the removed sheet of paper in front the audience for continued viewing while the next sheet of paper on the pad is used to collaboratively develop additional images.

Because many people are familiar with and are comfortable with using a conventional paper type flip chart, using the inventive system that mimics a conventional paper type flip chart is generally intuitive. In addition, while the image flipping process is intuitive, in many inventive embodiments the process required to flip an image to a slave presentation unit is not as distracting as the tearing and re-posting process required when a conventional paper pad type flip chart is employed.

In at least some embodiments of the present invention, in addition to being usable to add information to and delete information from a diagram or the like, the master presentation unit may also be useable to access digitally stored data generated by various types of computer software. For example, in at least some embodiments, the master unit may be used to access word processor documents, spread sheet images, CAD drawings and models and/or internet browser screen shots. Here, when a digitally stored image is accessed, the digitally stored image is presented simultaneously to the operator and the audience via the master display screen and, when flipped to one of the slave presentation units is presented in its entirety via the slave unit.

Moreover, in at least some embodiments of the present invention, the master presentation unit may be used to control various types of software via master unit interface tools or through interaction with some other type of input device such as a portable laptop computer, a palm type computing device or some other type of handheld remote control device. For instance, the master unit may be useable to access a CAD drawing tool, spread sheet software, an internet or other computer network browser, or the like. Where a software program is controlled via the master presentation unit, the master display screen operates in a manner similar to that of a typical computer monitor. In at least some embodiments the master display screen may be touch sensitive and programs may be controllable via selection of icons presented on the master display screen (e.g., within tool margins along the borders of the master screen).

In at least some cases, when a digitally stored image is presented via the master display screen, information on the image may be modified via interactive tools such as virtual ink pens and erasers as described above. In addition to being useable to flip information from the master display screen to the slave presentation units for posting, in at least some embodiments of the present invention, the master unit is also useable to re-access information currently presented via one of the slave presentation units so that the information presented by the slave unit can be modified via the master unit when desired. Here, the process of re-accessing information presented via one of the slave units for modification is akin to or mimics the conventional flip chart process of adding or deleting information presented on a previously posted sheet of flip chart paper and again should be intuitive to persons that are already familiar with how to effectively use a conventional flip chart.

Interconnectivity between the master and slave units of the present invention may be accomplished in any of several different well known ways including wireless RF communication, infrared communication, actual hardwired communication between the units or other type of communication. In addition, where a remote control interface device such as a palm type computer or laptop computer is employed to control the master presentation unit, connectivity between the remote device and the master unit may be either wireless or hardwired communication. Where wireless communication between an interface unit and presentation units is supported, the wireless communication may either be direct between the communicating system elements or, in the alternative, may be via access points distributed within or near the space in which the system components are being used.

Consistent with the above, at least some embodiments of the invention include a presentation system for presenting information to an audience within a space, the system comprising a communication network, a control interface, a master presentation unit including a processor and a master display screen, the master screen located within the space so as to be viewable by the audience within the space, the processor operable to transmit an image displayed on the master screen over the network upon user command issued via the control interface and at least a first slave presentation unit including a first slave image presenter operable to receive and present images that are transmitted by the master unit to the first slave unit over the network to the audience within the space.

In addition, some embodiments include a presentation system for presenting information to an audience within a space, the system comprising a communication network, a plurality of presentation units, each presentation unit positioned to present images to the audience within the space, at least one of the presentation units being a master unit including a processor and a display screen, the processor operable to transmit images displayed on the display screen over the network to another one of the presentation units upon user command, each of the other presentation units operable to receive and present images to the audience within the space that are transmitted by the master unit to the other unit over the network.

Moreover, some embodiments of the invention include a method for use with a plurality of image presenting units within a space wherein each of the presenting units is positioned so that an audience within the space can observe images presented by the unit, the method for managing presented images and comprising the steps of providing a control interface, presenting images via each of the presenting units, the image presented by each of the presenting units being a unit specific image, monitoring the control interface for an indication that the presented images should be stored, when an indication is received that the presented images should be stored for each presenting unit, correlating the unit specific image presented with a unit identifier to form an image-unit set and storing the image-unit sets for all of the units as a session image set.

Furthermore, some embodiments include a method for use with a master presentation unit, at least a first slave presentation unit, a communication network and a control interface, the master unit including a processor and a master display screen and the slave unit including a slave presenter, the method for presenting images to an audience within a space, the method comprising the steps of locating the master display screen within the space so as to be viewable by the audience within the space, locating the slave presenter within the space so that an image generated thereby will be viewable by the audience within the space, monitoring the control interface for an indication that an image presented on the master screen should be presented via the slave presenter and when an indication is received that the image presented on the master screen should be presented via the slave presenter, transmitting the image presented on the master screen to the slave unit for presentation via the communication network.

Still other embodiments include a presentation system for presenting information to an audience within a space, the system comprising a control interface, a presentation unit including a processor and a display screen, the screen having a master presentation space and at least a first slave presentation space separate from the master space, the processor linkable to the interface to receive commands therefrom, the processor programmed to monitor for a command from the interface to flip an image from the master space to the slave space and, when a command to flip an image is received, rendering the image from the master space unobservable and presenting the image via the slave space.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 7 is a view similar to the view of FIG. 5, albeit illustrating another exemplary slave presentation unit design;

FIG. 8 is a similar to FIG. 7 albeit illustrating one additional slave presentation unit;

FIG. 9 is similar to FIG. 7 albeit illustrating yet one more slave presentation unit embodiment;

FIG. 10b is a schematic view of components that make up one embodiment of the interface unit of FIG. 10a;

FIG. 13 is a flowchart illustrating a flipping method according to one aspect of the present invention that may be used with any one of the systems shown in FIGS. 1 through 12;

FIG. 14 is a sub-process that may be substituted for a portion of the method illustrated in FIG. 13 for retrieving images from a slave unit and re-presenting the images via the master unit;

DETAILED DESCRIPTION OF THE INVENTION

Figure 1:
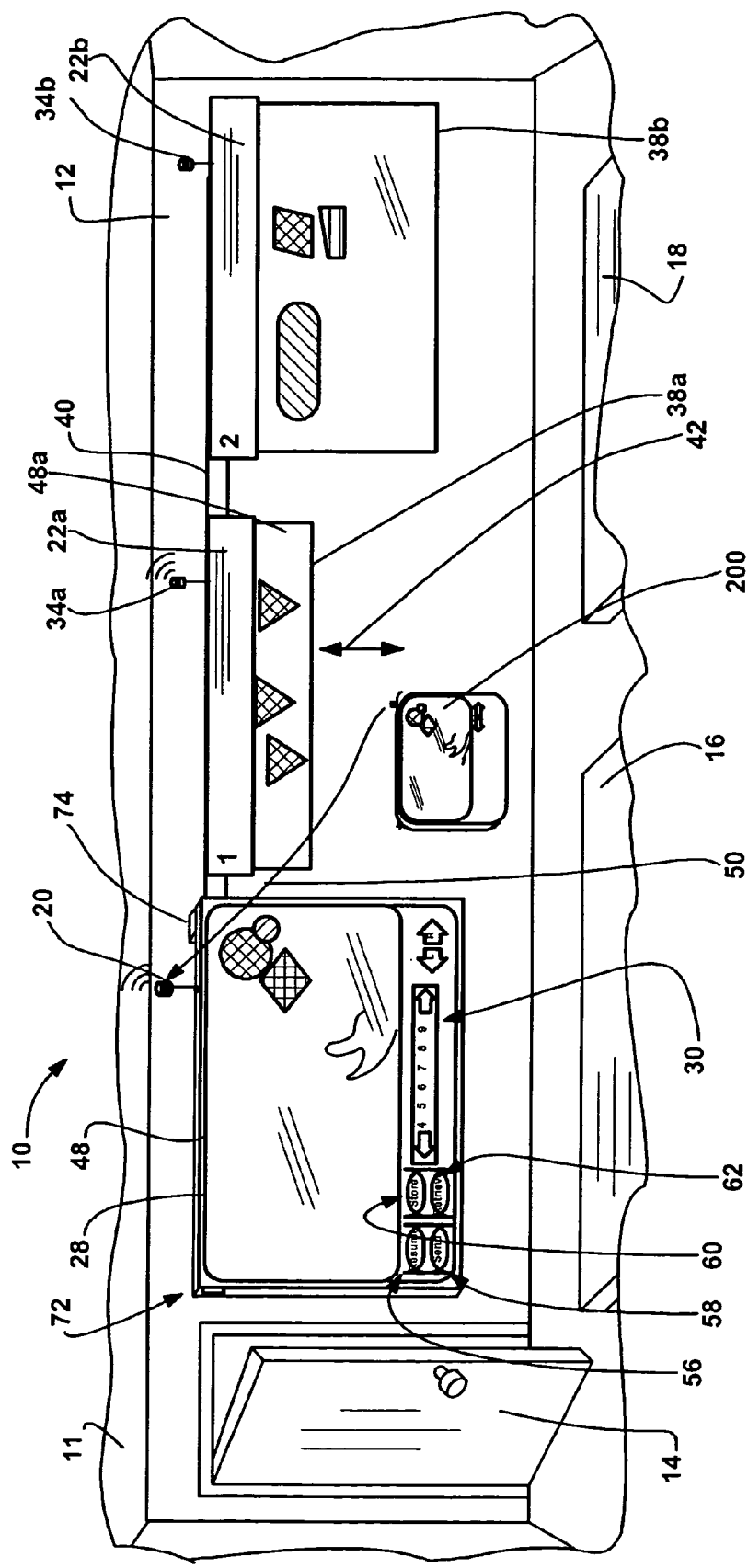
FIG. 1 is a perspective view of an exemplary flipchart mimicking system according to one embodiment of the present invention including a master presentation unit and first and second slave presentation units.

While the present invention may be embodied in any of several different forms, the present invention is described here with the understanding that the present disclosure is to be considered as setting forth exemplary embodiments of the present invention which are not intended to limit the invention to the specific embodiment(s) illustrated.

Referring now to the drawings wherein like reference characters represent similar elements throughout the several views and, more specifically, referring to FIG. 1, while the system components to be described may be used in any space to present information to an audience and/or to facilitate collaborative activity between a system operator and an audience, in order to simplify this explanation, the systems and components will be described in the context of an exemplary conference room 11 including a presentation wall 12 generally located at a front end of the conference room 11, a door 14 for entering and exiting the conference room 11 and a plurality of conference tables or desks, two of which are identified by numerals 16 and 18, respectively. The tables 16 and 18 are arranged as are seats (not illustrated) within room 11 so as to orient audience members within room 11 to easily observe information presented to the audience at the front of room 11 adjacent wall 12.

Figure 3:
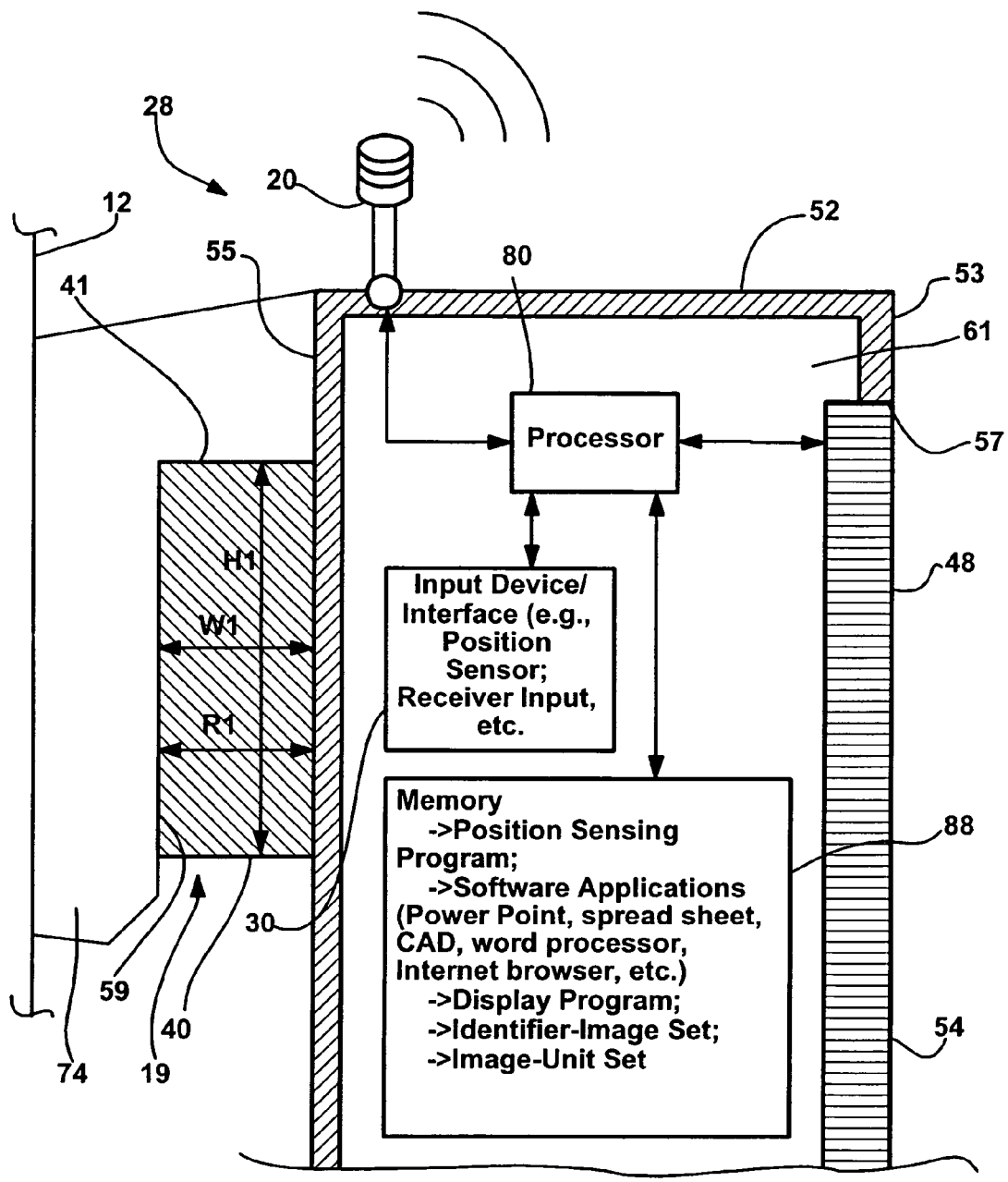
FIG. 3 is a schematic partial cross sectional view of the master unit of FIG. 2.

In at least some embodiments of the present invention, an elongated horizontal rail 40 is mounted to wall 12 at approximately 6 to 7 feet above the floor within room 11 for either temporarily or permanently supporting master and slave presentation units adjacent wall 12. Referring also to FIG. 3, rail 40 has a height dimension H1 and a width W1 that are perpendicular to the length of rail 40 and forms a horizontal top surface 41. Rail 40 may be mounted to wall 12 in any secure manner including bolts or the like and is held off the surface of wall 12 such that distal ends (e.g., 74 in FIG. 3) of presentation unit mounting members to be described in greater detail below fit between the wall and a rear surface of rail 40.

Figure 2:
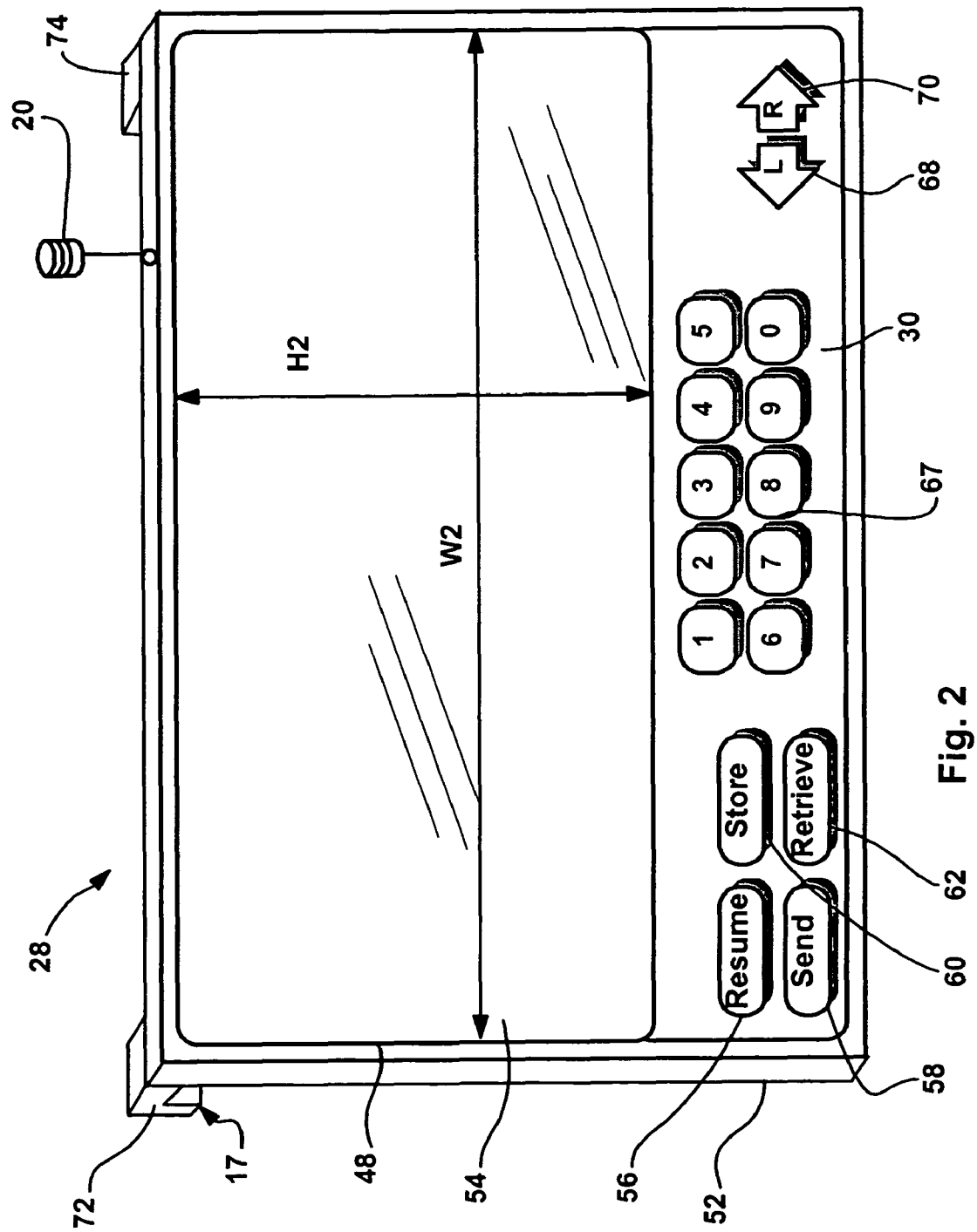
FIG. 2 is an enlarged perspective view of the master presentation unit of FIG. 1.

Referring still to FIG. 1, an exemplary first system 10 includes a master presentation unit 28 and first and second slave presentation units 22a and 22b, respectively. As illustrated in FIG. 1, each of the presentation units 28, 22a, 22b, etc., are mounted to and hang from rail 40 adjacent wall 12 so that front presentation surfaces (generally identified by numeral 48 or numeral 48 followed by a lower case letter) are easily observable by an audience within room 11. Referring also to FIGS. 2 and 3, master presentation unit 28 is an electronic image-forming device which, in the illustrated embodiment, includes a flat plasma or liquid crystal type display screen 48 mounted within a rigid generally rectilinear and relatively thin plastic or metal housing assembly 52, a transceiver 20 and first and second mounting hooks or members 72, 74, respectively.

Referring also to FIG. 3, housing 52 includes oppositely facing front and rear surfaces 53 and 55, respectively. Front surface 53 forms an opening 57 in which screen 48 is mounted so that a front surface 54 thereof having a width dimension W2 and a height dimension H2 is observable. Mounting members 72 and 74 extend from opposite lateral upper corners of rear surface 55 and extend downwardly at distal ends thereof so as to form channels 17 and 19 between rear surface 55 and facing surfaces of the distal ends (one of the facing surfaces identified by numeral 59 in FIG. 3). Each channel 17, 19, has a recess dimension R1 which is substantially similar to width dimension W1 of rail 40 (see FIG. 3).

To mount master unit 28 to rail 40, as best illustrated in FIGS. 1 and 3, unit 28 is lifted and positioned with respect to rail 40 such that the channels formed by members 72 and 74 are above rail 40. Thereafter, unit 28 is lowered until sections of rail 40 are received within the channels formed by members 72 and 74 and so that members 72 and 74 are generally supported on the top rail surface 41 (see FIG. 3). Although not illustrated, one or more additional extension member may be provided that extends from rear surface 55 proximate the bottom end thereof to contact the wall 12 surface and stabilize unit 28 in a substantially vertical orientation.

Referring again to FIG. 3, in addition to the components described above, exemplary master presentation unit 28 includes a processor 80, a keyboard or other type of control interface 30 (i.e., the keyboard is not necessary where interactivity is provided via other means such as selectable on-screen icons, etc.) and a digital memory 88. Processor 80 and memory 88 are mounted within cavity 61 formed by housing 52 while keyboard 30 includes keys supported by the housing structure. Processor 80 is linked to each of transceiver 20, display screen 48, keyboard 30 and memory 88 via a plurality of data busses (not labeled). Generally, transceiver 20 is capable of transmitting and receiving information via any of several different wireless technologies (e.g., RF, infrared, etc.) and via any of several different wireless communication protocols (e.g., 802.11b, Bluetooth, etc.) within the vicinity of transceiver 20 (e.g., within the space defined by a conference room 11).

Memory 88 is a digital memory device and includes a plurality of different types of information usable by processor 80 to perform various methods. Generally, the information stored in memory 88 takes two forms including programs run by processor 80 and data such as images presented via display screen 48. Programs run by processor 80 include, in at least some cases, position sensing programs for sensing the position of virtual ink pens and virtual ink type eraser devices used to add information to and delete information from screen 48 as well as display driver programs for presenting information via display 48.

In addition, memory 88 includes programs used to manage images present via display 48. For instance, in at least some embodiments of the present invention, a program in memory 88 may assign unique identifier numbers or the like to each image flipped from unit 28 to one of the slave presentation units and may store each flipped image and corresponding identifier number within memory 88 for subsequent access. As another instance, when an image is flipped to a specific one of the slave presentation units, the master unit processor 80 may be programmed to correlate and store the flipped image with a unit identifier that uniquely identifies the slave unit to which the image is being flipped. After an identifier and an image is stored in memory 88, the image may be accessed via reference to the unique identifier.

Moreover, in at least some embodiments of the present invention, copies of conventional software applications such as PowerPoint, various spread sheet applications, CAD applications, word processor applications, internet browser applications, etc., may be stored within memory 88 for access and running by processor 80. Here, it should be appreciated that, in at least some embodiments of the invention, conventional software applications may not be useable with system 10 and in that case, copies of the conventional software applications would not be stored in memory 88. Moreover, it should be appreciated that, in at least some embodiments of the invention, software applications such as PowerPoint, spreadsheets and the like may be stored in or accessed via a palm or laptop type computer useable with master presentation unit 28 so that, while processor 80 is used to display images corresponding to conventional software applications, processor 80 itself does not run the software applications. Here, the computer would run the programs and provide information to processor 80 to drive the display 48.

Referring still to FIG. 3, control interface 30 may include various types of input devices. For instance, in at least some embodiments of the invention, it is contemplated that mechanical hardware type buttons like the keys illustrated in FIG. 2 may be provided within the front surface 53 of housing 52 for providing commands to processor 80 such as flip commands (i.e., commands that indicate that an image currently on display 48 should be transmitted to slave presentation units and then removed from display 48) and other data access and program control commands. In the alternative, or in addition to hardware type buttons, in at least some embodiments of the invention, it is contemplated that touch selectable icons may be provided on display screen 48 for selection by a system operator which, when selected, provide command signals to processor 80 to perform processes. In some cases the input device 30 may include image augmentation capabilities (i.e., be in part an augment interface) so that marks can be added to an image on screen 48 or deleted. To this end, see U.S. patent application Ser. No. 10/452,178 which was filed on Jun. 2, 2003 that is entitled "Electronic Whiteboard" and which is incorporated herein in its entirety by reference. In the alternative, in at least some embodiments of the invention, input to master unit 28 may always be via a palm or laptop type computing device (e.g., a portable control interface) where commands to processor 80 are received via transceiver 20.

Hereinafter, unless indicated otherwise, in order to simplify this explanation, it will be assumed that the master unit 28 includes a mechanical type keyboard 30. In addition, unless indicated otherwise, palm and laptop computers and control devices will be referred to generally as hand held devices (HHDs). Moreover, while unit and device communication may be wired, it will be assumed here that all unit and device communication is via a wireless protocol and transceivers (e.g., 20 in FIG. 2).

Referring once again to FIGS. 1 and 2, exemplary master unit keyboard keys include a resume key 56, a send key 58, a store key 60, a retrieve key 62, a left send key 68, a right send key 70, and a number pad 67. The selectable keys described and illustrated herein are only exemplary and, in many cases, additional selectable keys or a subset of the keys described herein may be provided via display 48, the selectable key set being dependent upon the functions supported by the system 10 and, in at least some cases, the relative juxtaposition of system components. In addition, where conventional software programs are run by processor 80 or where display 48 is used as a large display for an HHD running conventional software programs, mouse or touch selectable icons required to support the software applications may appear on display 48.

Referring still to FIGS. 1 and 2, in at least some cases, it is contemplated that master presentation unit 28 may be positioned to one side of the slave presentation units 22a, 22b, etc. relative to an audience viewing the units within room 11. In this case, to flip an image from display 48 to one of the slave presentation units 22a, 22b, etc., there must be some way to specifically identify the slave unit to receive the flipped image. In the exemplary embodiment described herein, unique slave unit identifiers "1" and "2" are provided on each one of the slave units 22a, 22b, etc., which are easily viewable by a system operator when the operator is in a position to facilitate collaborative activity by interacting with master unit 28. In FIG. 1, the unit identifiers "1" and "2" are permanently printed at one end of each of the unit housing assemblies.

In the present example, processor 80 is programmed to monitor keyboard 30 for an indication that the image on display 48 is to be flipped to one of units 22a or 22b. In this case, it is contemplated that, to flip an image to one of units 22a or 22b, a system operator uses number 67 to select the unit identifier number corresponding to the unit to which the image is to be flipped and subsequently selects send key 58. For example, to flip an image from display 48 to unit 22a, the operator uses pad 67 to select number "1" and then selects key 58. Similarly, to flip an image to unit 22b, the operator selects number "2" from pad 67 and subsequently selects send key 58.

Here, it is assumed that each separately addressable slave units and also, in some embodiments, master unit 28, has a unique network address that can be used to send data thereto. For instance, in FIG. 1, slave units 22a and 22b may be assigned unique wireless addresses "XP45519784" and "QZ1433217", respectively, while master unit 28 is assigned address "AM7966142". The addresses of slave screens are correlated with the unique salve unit identifiers (e.g., "1" and "2" in the present example) and the correlated addresses and identifiers are stored in master unit memory 88. In addition, processors in each of the slave units 22a, 22b, etc., are programmed to monitor for and receive wireless signals sent to their respective network addresses. When a slave unit is selected as a target for a flipped image, processor 80 identifies the network address associated with the target slave unit, generates an image data packet including the image and the address of the target slave unit, transmits the data packet to the selected slave unit and then, in at best some embodiments, erases the image from display 48 (i.e., blanks display 48) or otherwise renders the image un-observable via display 48 to provide a clean and clear surface 48 in a manner that mimics a conventional paper pad type flip chart. In other embodiments a second affirmative step may be required to render the master image un-observable.

In at least some embodiments of the present invention, master presentation unit 28 is also useable to retrieve images presented via the slave presentation units 22a, 22b, etc., so that those images can be edited and then re-presented via the slave units in the edited form. To this end, referring still to FIGS. 1 through 3, when an image is flipped from master unit 28 to one of the slave units 22a, 22b, etc., in at least some inventive embodiments, the image data received by the slave unit is temporarily stored in a slave unit memory (see 119 in FIG. 5).

After an image is presented via a slave unit, if a system operator wants to edit that image, in a manner similar to the manner described above for flipping an image to unit 22b, the system operator uses number pad 67 to select the identifier number corresponding to the slave unit and then selects retrieve key 62. When retrieve key 62 is selected, master processor 80 forms a retrieve data packet including an image retrieve request and the address of the slave unit from which to retrieve the image and wirelessly transmits the retrieve data packet to the slave unit. In response, the slave unit generates an image data packet including the slave image and the network address of the master unit and transmits the image data packet back to the master unit 28. When unit 28 receives the image data packet, master unit 28 re-presents the image via display 48 for further collaborative viewing/editing.

Instead of accessing slave images from slave unit memories as described above, in at least some inventive embodiments, when master unit 28 flips an image to a slave unit, the image may be correlated with and stored with the unique slave unit identifier in master unit memory 88. Thereafter, when an operator wants to re-present a slave image via master unit 28 for editing or the like, the operator can select the appropriate slave unit identifier (i.e., the identifier number associated with the slave unit presenting the image to be re-accessed) via number pad 67 followed by retrieve key 62 causing processor 80 to access the previously stored image in memory 88 and present the image via display 48.

Referring yet again to FIGS. 1 through 3, according to at least one aspect of the present invention, during a presentation or collaborative activity, after images are presented via one or more of the presentation units 28, 22a, 22b, etc., if an operator wishes to cease a presentation with the intention of continuing the presentation at a later time, a function is provided whereby the operator can quickly store all of the images currently presented via the presentation units such that, upon resuming the presentation or collaborative activity, all of the currently presented images can be quickly and immediately re-presented via the presentation units in the same relative juxtapositions. To this end, processor 80 may be programmed to monitor store key 60 and, when icon 60 is selected, may correlate each of the unique presentation unit identifiers (e.g., "1", "2", etc., an identifier uniquely associated with master unit 28, etc.) with the image currently displayed by the corresponding presentation unit as an image-unit set and then to store the image-unit set in memory 88. Thereafter, to re-present the images via the master and slave units at a subsequent time, the operator may select resume key 56 after which processor 80 accesses the image-unit set and re-presents those images via the master and slave units.

Here, when an image-unit set is stored or is re-accessed, processor 80 may be programmed to enable the operator to uniquely identify the image-unit set by providing a name therefore useable to recognize the specific image-unit set. In this case, more than one image-unit set may be stored in memory 88 and subsequently unambiguously retrieved to resume presentations.

While images may be stored with unit identifiers, it should also be appreciated that similar results can be achieved by storing images along with network addresses when store key 60 is selected. Here, when a session is resumed, processor 80 simply accesses the stored images and addresses and flips the images to the correlated addresses without having to perform the intermediate step of correlating the unit identifiers and addresses.

In at least some embodiments it is contemplated that the number of slave units used with a master unit will not change and that keys dedicated to specific slave units and functions may be provided on keyboard 30. For instance, where a system 10 only includes one master unit 28 and two slave units 22a and 22b, separate send and retrieve keys for each of the slave units 22a and 22b may be provided so that single key selection can cause image flipping/retrieving. Similarly, referring once again to FIG. 1, in at least some cases, it is contemplated that a master unit 28 may be positioned between two slave units (i.e., master unit 28 and slave unit 22a would be swapped so that unit 28 is between slave units 22a and 22b). In this case, simple left and right send icons 68 and 70, respectively, may be used to flip images from master unit 28 to the slave units to the left and right of the master unit, respectively. Although not illustrated, simple left and right retrieve arrow icons similar to icons 68 and 70 may also be provided for retrieving images from the slave units to be re-presented via screen 48.

Figure 4:
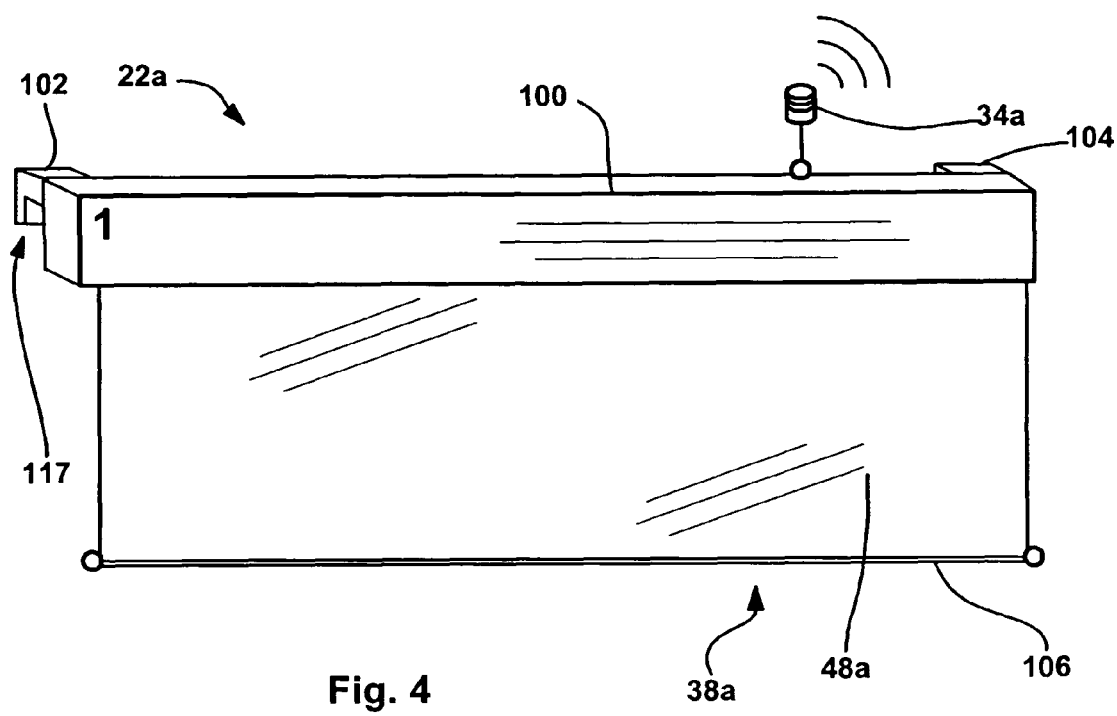
FIG. 4 is a perspective view of one of the slave units of FIG. 1.
Figure 5:
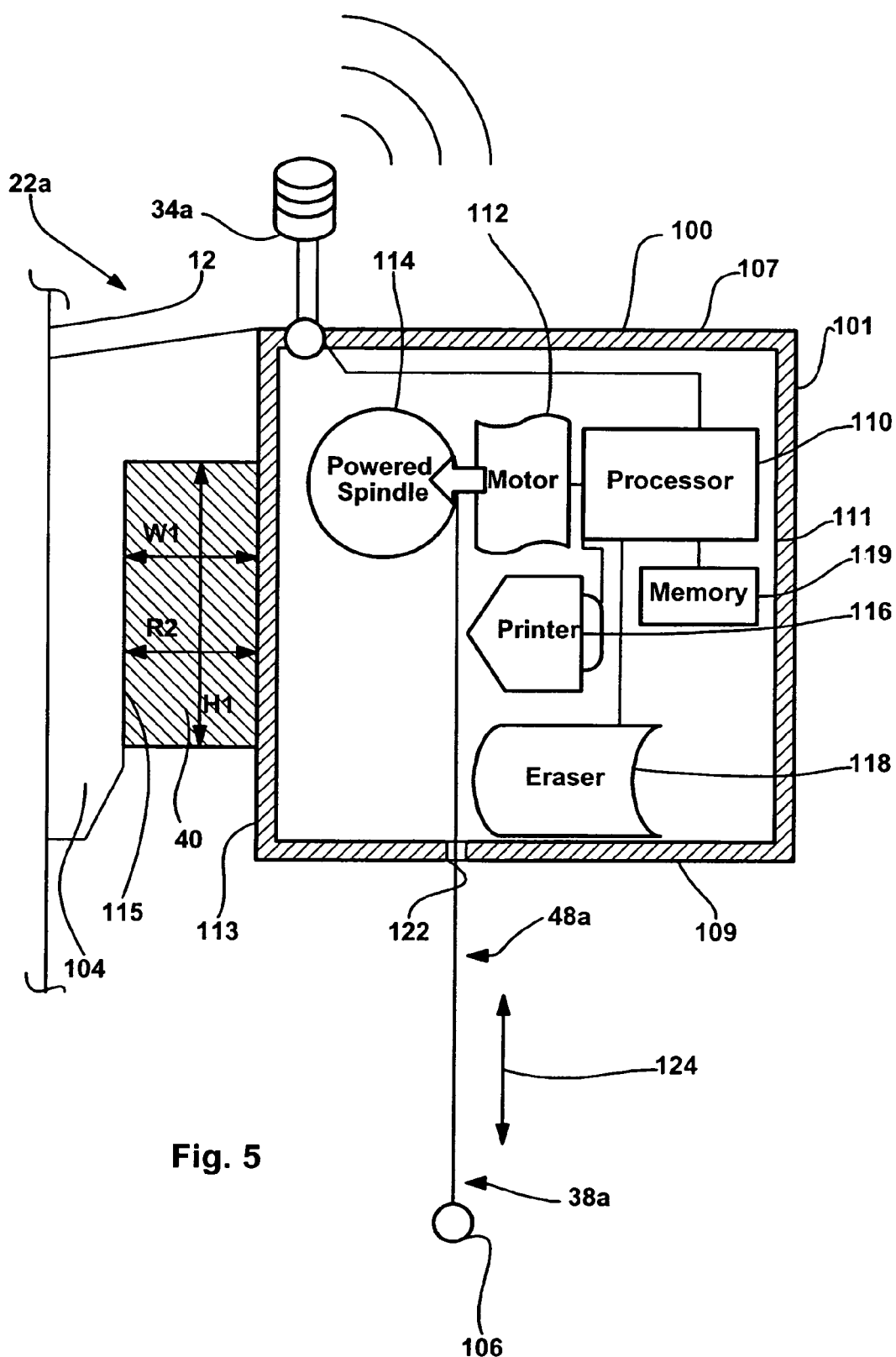
FIG. 5 is a schematic partial cross sectional view of the slave presentation unit of FIG. 4.

Referring once again to FIG. 1, in at least some embodiments of the present invention, each of the slave presentation units 22a and 22b will have a similar construction and similar operation and therefore, in the interest of simplifying the present explanation, only unit 22a will be described here in detail. Referring also to FIGS. 4 and 5, slave presentation unit 22a is a pull-out, roller window shade style unit and includes a housing assembly 100 (hereinafter housing 100), a transceiver 34a, a rollable and unrollable presentation screen 38a, first and second mounting members or hooks 102 and 104, respectively, a processor 110, a motor 112, a powered screen spindle 114, a slave presenter/print applicator that takes the form of a printer 116 in the present example, an eraser 118 and a memory 119. Housing 100 is generally a rigid box shaped assembly that forms a cavity 105 between top and bottom walls 107 and 109, respectively, and front and rear walls 111 and 113, respectively. The front wall 111 and rear wall 113 form opposite facing front and rear surfaces 101 and 103, respectively. Bottom wall 109 forms a slit or opening 122 generally along the length of housing 100 through which a lower end of screen 38a extends. Each of mounting members 102 and 104, like mounting members 72 and 74 that are secured to master unit housing 52, are secured to an extend rearwardly from the rear surface 113 of housing 100 and extend from opposite ends of housing 100. The distal ends of each of members 102 and 104 extend downwardly such that member 102 forms a channel 117 and member 104 forms a channel 115 having a channel dimension R2 which is similar to the width dimension W1 of rail 40. Thus, as in the case of main unit 28, slave unit 22a is mountable to rail 40 by placing members 102 and 104 over rail 40 so that rail 40 is received within channels 115 and 117.

Transceiver 34a is mounted to top wall 107 and extends upwardly therefrom. Screen 38a, in at least some embodiments of the present invention, is a flexible and rollable generally rectilinear member that, when unrolled, extends through opening 122 and there below to provide a presentation surface 48a that faces in the same direction as front surface 101 of housing 100. In at least some embodiments, presentation surface 48a is a writable/erasable surface such as Mylar (trademarked name of a polyester material developed and sold by DuPont) or the like on which erasable ink can be printed or plotted and can subsequently be erased. In some cases, a weighted bar 106 may be mounted to a distal lower end of screen 38a that helps to maintain screen 38a substantially flat when screen 38a is unrolled and extends below housing 100.

In the illustrated embodiment each of processor 110, motor 112, spindle 114, printer 116 and eraser 118 is mounted within housing cavity 105. Processor 110 is linked to each of motor 112, printer 116 and eraser 118 for controlling each of those components. Processor 110 is also linked to memory 119 for accessing information therein and is linked to transceiver 34a to send and receive data packets. Motor 112 is linked to spindle 114 for rolling and unrolling slave screen 38a which is attached at a top end to spindle 114.

Processor 110 controls printer 116 to, when an image is flipped to slave unit 22a from master unit 28, print the image on presentation surface 48a either as screen 38a is being unrolled or, in the alternative, by moving one or more printer heads adjacent to the surface 48a while moving screen 38a up and down via spindle. In any event, processor 110 controls printer 116 to provide a rendition of the image flipped to unit 22a from master unit 28. In some cases the rendition will be in color while in other cases it may be in black and white. In still other cases the user may have the option to print in color or in black and white.

Eraser 118 is controlled by processor 110 to erase ink applied by printer 116 to presentation surface 48a. To this end, eraser 118 may simply move back and forth along the length of housing 100 while holding an eraser pad on surface 48a as screen spindle 114 rolls up screen 38a. In the alternative, processor 110 may be able to control eraser 118 to erase certain information from surface 48a while leaving other information on surface 48a. Here, for instance, where a system operator re-accesses an image from slave unit 22a to be edited via master unit 28, if the edit simply entails erasing a distinct part of the image via unit 28 and then re-flipping the modified image back to unit 22a, the modified image may be presented via unit 22a by erasing the appropriate information from surface 48a and unrolling screen 38a so that the modified image is viewable via surface 48a.

Thus, in the embodiment illustrated in FIGS. 1 through 5, when an operator indicates that an image on master screen display 48 is to be flipped to unit 22a, the image data packet is transmitted via transceiver 22 to processor 110 via transceiver 34a after which processor 110 controls motor 112 and printer 116 to simultaneously unroll screen 38a and apply ink to surface 48a thereby forming the flipped image on surface 48a. After an image has been formed on surface 48a, if the system operator flips another image to unit 22a, processor 110 first controls motor 112 and eraser 118 to roll up screen 38a while simultaneously erasing the ink printed thereon. After surface 48a has been cleaned, processor 110 next controls motor 112 and printer 116 to again apply ink to surface 48a thereby providing the newly flipped image on surface 48a for the audience to view.

While it may take some time (e.g., thirty or more seconds) for one of the slave units 22a or 22b to erase an existing image and to apply ink forming a new image on surface 48a, after an image is flipped from master unit 28, display 48 can be cleared immediately and used to continue the collaborative process. Thus, the delay in generating an image in the manner described above will not delay the collaborative effort.

Referring to FIG. 1, it should be appreciated that the dimensions of the master display screen 48 and the portion of the slave screen 38a that is unrolled and used to present an image are similar such that an image flipped to and presented via screen 38a has a scale substantially similar to the scale of the image that was originally presented via display 48.

Referring still to FIGS. 1 through 5, it should be appreciated that where the master and slave units 28 and 22a, 22b, etc., are removable from rail 40, the entire system described above can be easily transported from one conference room 11 to another and can easily be set up by placing the mounting members that extend from the rear surfaces of the units over a rail in the other conference room similar to rail 40. During transport, the screens (e.g., 38a) of the slave units can be completely rolled up for protection and to provide a compact configuration.

Figure 6:
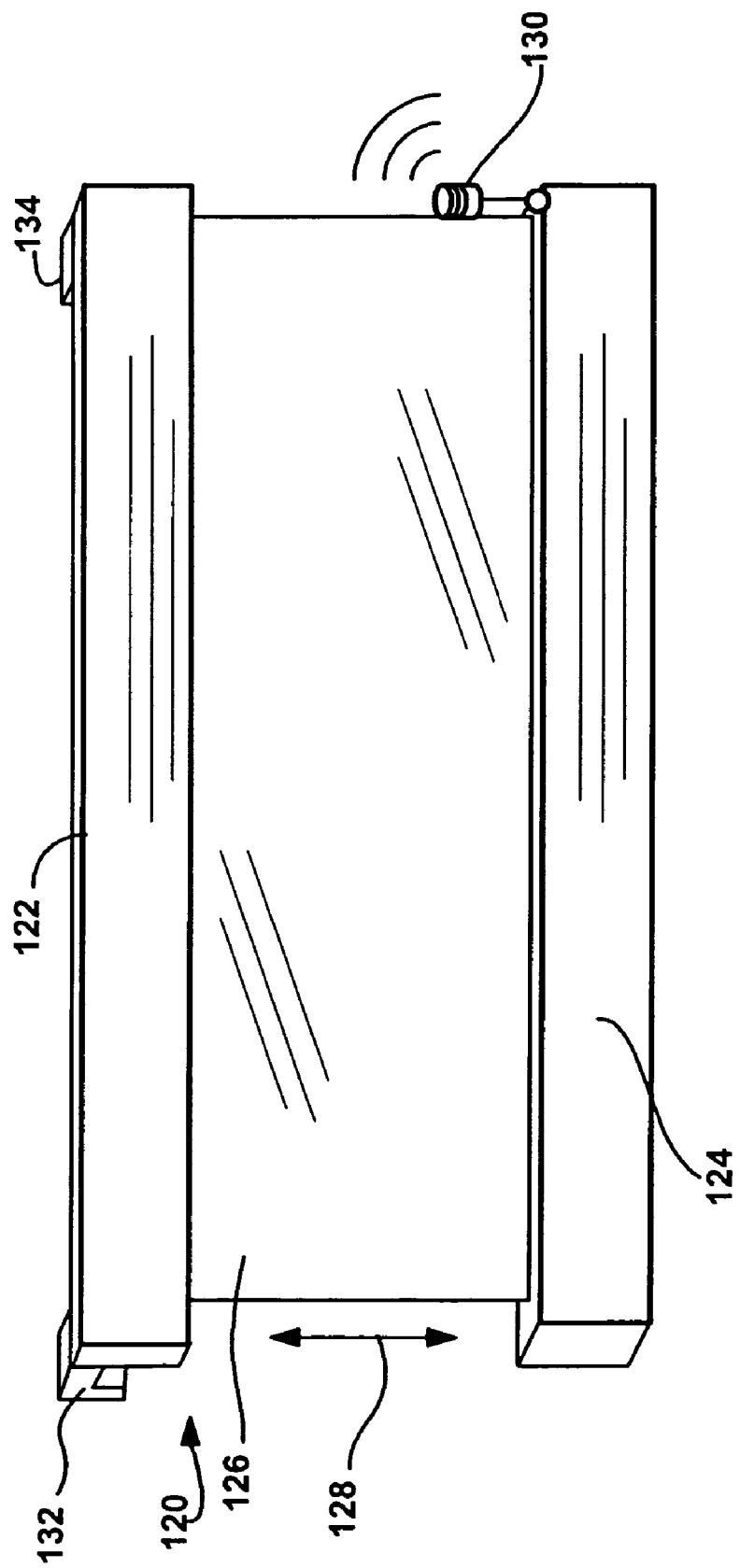
FIG. 6 is a perspective view of a second embodiment of a slave unit that may be used with the master unit of FIG. 1.

Referring now to FIG. 6, a second embodiment of a slave presentation unit 120 is illustrated including a top header 122, a housing 124, a transceiver 130, a screen 126 and first and second mounting members 132 and 134, respectively. Mounting members 132 and 134 are similar in construction and operation to mounting members 102 and 104 described above and therefore will not be described here in detail. Here, it should suffice to say that members 132 and 134 extend from a rear surface of header 122 for mounting unit 120 to a rail like rail 40 described above.

In this second embodiment, screen 126 is rigidly secured to a lower surface of header 122 and lower housing 124 forms an opening (not illustrated) through which a distal lower end of screen 126 extends and in which a screen spindle similar to spindle 114 described above with respect to FIG. 5 is mounted. In addition, in this embodiment, the processor 110, motor 112, printer 116, memory 119 and eraser 118 described above with respect to FIG. 5 are also mounted within housing 124 and transceiver 130 extends upwardly from housing 124. Here, when an image is flipped from master unit 28 to slave unit 120, the image data packet transmitted is received via transceiver 130 and the processor in housing 124 simultaneously controls the motor and printer therein to unroll screen 126 and apply ink to surface 126 forming the flipped image thereon as housing 124 descends (see arrow 128) below header 122. An advantage here is that the image can be printed from top to bottom. Similarly, when the image on surface 126 is to be erased, the processor inside housing 124 simultaneously controls the motor and eraser in housing 124 to roll screen 126 up and erase ink from surface 126.

Referring now to FIGS. 7, 8 and 9, three additional embodiments 171, 173 and 175 of slave units that are similar to the slave unit of in FIG. 5 are illustrated. In FIGS. 7 through 9, each of the slave units includes a processor 110, a motor or motivator of some type 112, a printer 118, an eraser 116, a memory (not illustrated), mounting members (e.g., 104) and a transceiver 34a similar to those described above with respect to FIG. 5 and therefore, in the interest of simplifying this explanation, those components are not separately described again here. The primary difference between the embodiments of FIGS. 7, 8 and 9 and the embodiment of FIG. 5 is in how the presentation screens are extended and retracted.

The embodiment of FIG. 7 is generally a pull-out endless loop style unit and includes both a powered spindle 151 and a freewheeling spindle 148. Powered spindle 151 is driven by motor 112 under the control of processor 110. In FIG. 7, screen 144 is a continuous belt or loop type screen that wraps around powered spindle 151 within housing 100 and extends downward and wraps around freewheeling spindle 148 below housing 100 such that a front screen segment forms a front presentation surface 155 and a rear screen segment forms a rear surface 159 facing in a direction opposite the direction of surface 155. In at least some embodiments, housing 100 forms two slit like openings 140 and 142 that extend generally along the entire length of housing 100 to allow screen 145 to pass therethrough.

In at least some embodiments, spindle 151 may be powered in either clockwise or counterclockwise direction so that screen 144 can move in either direction up or down as indicated by arrow 146 and so that freewheeling spindle 148 can rotate in either clockwise or counterclockwise directions as indicated by arrow 150. Here, in at least some embodiments of the present invention, when an image is flipped to unit 171, processor 110 controls the motor 112 and printer 116 simultaneously to apply ink and form the image on screen 144 as spindle 151 rotates in the clockwise direction. After an image is formed, the image is viewable on front surface 155 between housing 100 and freewheeling spindle 148. In this case, to erase the image, spindle 151 may be rotated in the counterclockwise direction while eraser 118 removes the ink from screen 144. In the alternative, to erase an image from front surface 155, spindle 151 may be rotated in the clockwise direction so that the image rotates about freewheeling spindle 148, back up toward and around powered spindle 151 and again down past eraser 118 while eraser 118 erases the ink on the screen. In yet one other embodiment that is not illustrated in FIG. 7, eraser 118 may be positioned on the opposite side of screen 144 within housing 100 and may be used to erase images presented thereto on screen 144 as section 155 is moved up through opening 140.

Referring to FIG. 8, exemplary slave presentation unit 173 is a pull-out drop loop style unit and includes a first powered spindle 163 and a second powered spindle 165, both mounted within housing 100, as well as a freewheeling spindle 167 wherein first and second ends of a presentation screen 181 are mounted to and rolled around spindles 163 and 165, respectively, and a central portion of screen 181 wraps around freewheeling spindle 167 that hangs below housing 100. In this case, the powered spindles 163 and 165 may be used to move a presentation surface 183 of screen 181 either upward or downward as indicated by arrow 146 and about spindle 167 in either direction as indicated by arrow 187. As in the above slave unit embodiments, a printer 116 and an eraser 118 may be controlled to apply ink to the presentation surface or to remove ink therefrom to reflect image flipping activity caused by interaction with master unit 28.

Referring now to FIG. 9, unit 175 is a pull-out accordion style unit similar to the units described above with respect to FIGS. 5, 7 and 8 except that the spindles are replaced by a take up and let down assembly 174 and the screen, instead of being a rollable screen member, is a segmented accordion type screen 172 including elongated horizontal screen members, two of which are collectively identified by number 189, that are linked along horizontal elongated edges. Here, motivator 112 is controlled by processor 110 to let out the screen 172 adjacent printer 116 and to take up the screen 172 adjacent eraser 118 as indicated by arrow 170.

Figure 10A:
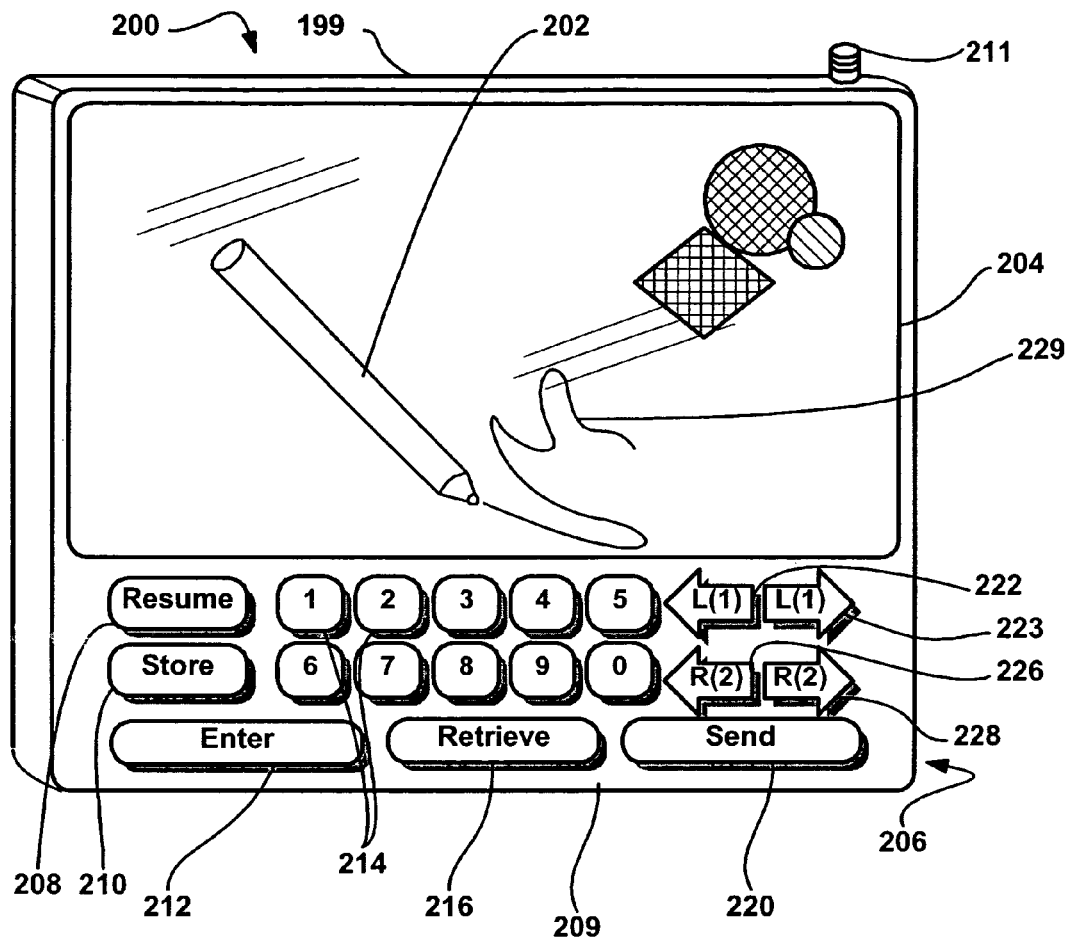
FIG. 10a is a perspective view of a handheld interface unit shown in FIG. 1.
Figure 10B:
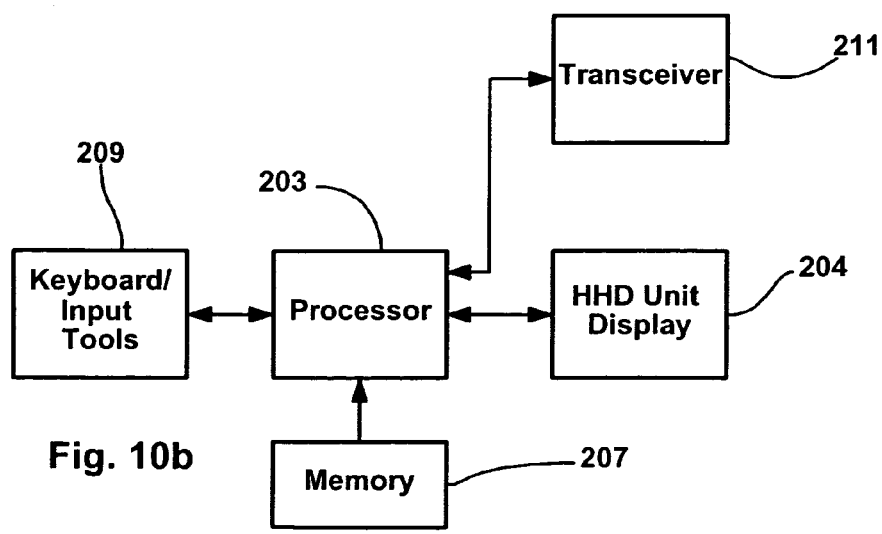

Referring now to FIGS. 1, 10a and 10b, an exemplary HHD interface unit 200 includes a generally rectilinear and rigid plastic or metallic housing 199 that protects and supports other unit components including a processor 203, a display 204, a keyboard 209 and a transceiver 211. Processor 203 is linked to each of transceiver 211, screen 204, memory 207 and keyboard 209 to receive information therefrom or provide information thereto, where appropriate. Processor 203 runs various programs stored in memory 207. In addition, in at least some embodiments of the present invention, processor 203 may be able to access a conventional computer network (e.g., a local area network, a wide area network, the Internet, etc.) via wireless communication with access points mounted within or proximate conference room 11. Communication between wireless devices like unit 200 and a network server via access points is well known in the wireless communication arts and therefore, in the interest of simplifying this explanation, will not be described here in detail.

Keyboard 209 includes hardware keys that are akin to the keyboard keys described above with respect to FIG. 2. Specifically, mechanical keys 208, 210, 216 and 220 are akin to keys 56, 60, 62 and 58 described above and can be used to resume a presentation, store images associated with a presentation, retrieve images presented by slave units so they can be re-presented by the master unit 28 and to send images from the master unit 28 to any one of the slave units, respectively. Number pad 214 is used in a manner similar to the number pad 67 described above with respect to FIG. 2. For instance, to indicate a slave unit associated with identifier number "2" to which an image should be flipped, an operator selects the "2" key from keyboard 209 followed by the send key 220.

Left arrow key 222 is a send left key indicating, as its label implies, that an image currently presented via master unit 28 should be sent to a slave unit to the left of master unit 28. Similarly, right arrow key 228 is a send right key indicating that an image currently displayed by the master unit 28 should be sent to the slave unit to the right of the master unit 28. Right directed arrow key 223 is a left retrieve key indicating that the image currently presented on a slave unit to the left of master unit 28 should be retrieved to the master unit and displayed thereby. Similarly, left directed arrow key 226 is a right retrieve key indicating that an image currently presented by a slave unit to the right of master unit 28 should be retrieved and displayed via master unit 28.

In addition to the keys described above, an enter key 212 is provided via unit 200 which can be used to indicate that information entered via other keyboard keys should be acted upon. For example, in cases where a presentation is to be resumed and a specific seven digit number code must be entered to access a specific previously stored image-unit set, after resume button 208 is selected, processor 203 may present a session identification number field via display 204 in which a specific sequence of seven numbers has to be entered in order to access the images corresponding to an image-unit set and present the images via the presentation units. In at least some embodiments of the invention, it is contemplated that unit 200 may include a full keyboard compliment including letters, numbers and function keys that are typically found on a computer keyboard so that unit 200 can, in effect, be used as a complete laptop computer to interact with various software applications (e.g., Power Point, spreadsheet applications, word processor applications, etc.).

Referring still to FIGS. 1 and 10*a*, in at least some embodiments, screen 204 is a fully functional touch sensitive flat panel display screen which can be used to display virtually any type of visual image including images corresponding to software applications, images corresponding to information applied to screen 204 via a stylus 202 or other similar types of interface tools and, in at least some cases, images that combine software generated images and applied information. Thus, for instance, when a Power Point slide is presented on display 204, in at least some cases, a system operator may use stylus 202 to make a mark (e.g., 229 in FIG. 10*a*) on display 204 which is tracked by processor 203 and in response to which processor 203 changes the image on display 204 so that the mark is represented. Here, the mark is referred to as a virtual ink mark because the mark appears on display 204 despite the fact that no real ink is applied to the surface of screen 204.

Importantly, according to one aspect of the present invention, the information presented via display 204 of control interface 200 is immediately updated on the master display 48 of unit 28. Thus, while a system operator may be anywhere within conference room 11 when using HHD 200, the operator can use HHD 200 to modify the image displayed on display 48 in a real time and collaborative flip chart like manner. After an image on display 48 is completed and when the operator wishes to flip the image from unit 28 to one of the slave units 22*a* or 22*b* in FIG. 1, the operator uses HHD 200 to flip the image to the appropriate slave unit. For instance, in the example illustrated in FIG. 1, to flip an image from master unit 28 to slave unit 22*a*, the operator selects the "1" key on HHD 200 followed by send key 220. After send key 220 is selected, processor 203 forms a flip command data packet commanding an image flip to the selected slave unit and including the master unit network address and transmits the flip command data packet to processor 80 (see again FIG. 3) via transceivers 211 and 20. In response to receiving the flip command, processor 80 forms an image data packet including the currently displayed image and transmits the image data packet to the slave unit selected via HHD 200.

Referring still to FIGS. 10*a* and 10*b* and FIG. 1, unit 200 may be a stand alone laptop computer and may provide the complete data processing platform where master unit 28 is simply an output and input device. Here, for instance, programs to track interactivity with display 20 may be run by unit 200 and unit 200 may simply provide display driving data to the master unit processor 80.

In addition, in this case, the unit 200 may completely organize the image presentation and master unit 28 may not perform the flipping and retrieving processes. Here, for instance, unit 200 may store all of the images including the images displayed by the master and slave units. When a presenter indicates via master unit 28 that the master image is to be flipped to a slave unit, the command may be received by unit 200 which in turn causes the flip to occur via transmission of the master image to the designated slave unit. In addition, here, unit 200 may also automatically transmit a command to the master unit to erase the flipped image. Retrieval commands would also be performed via unit 200 as opposed to via the master processor 80.

Figure 11:
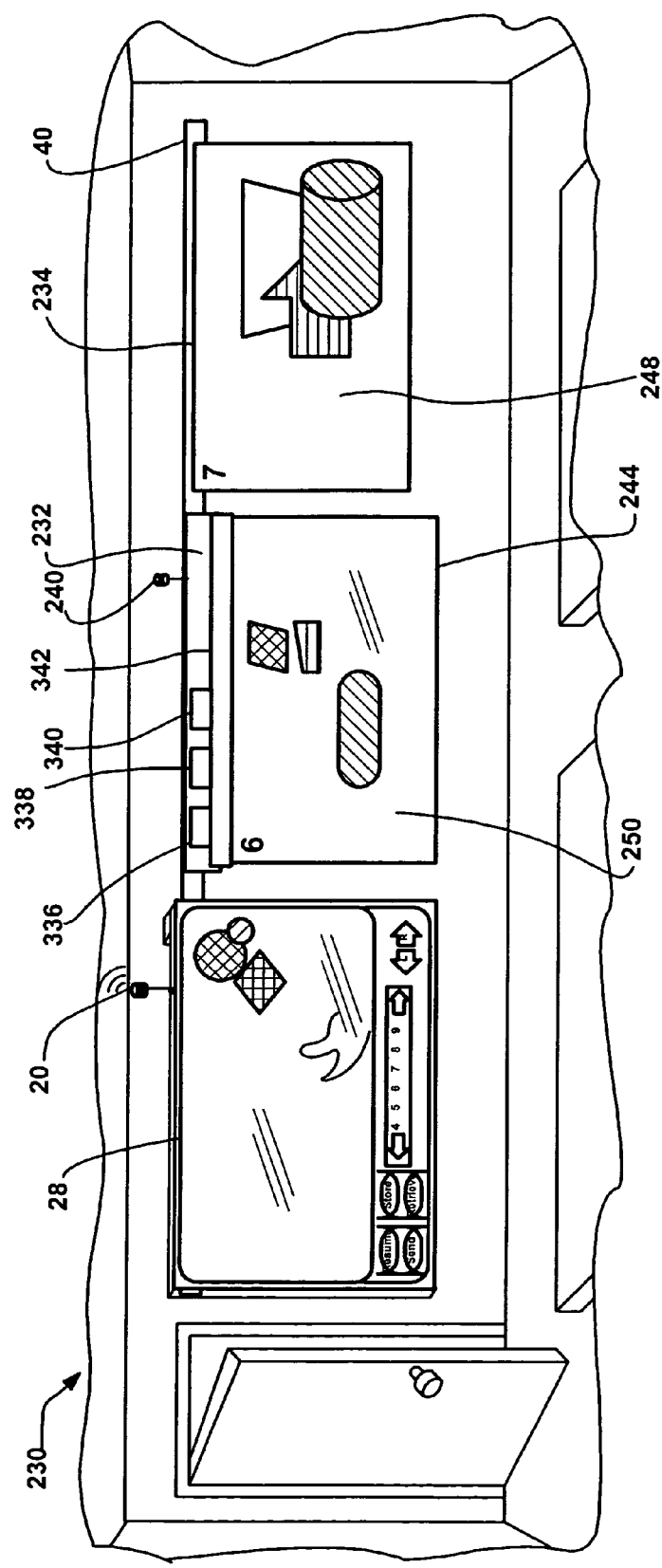
FIG. 11 is similar to FIG. 1, albeit illustrating a system that includes a different type of slave presentation unit.

Referring now to FIG. 11, a second exemplary system 230 according to at least some aspects of the present invention is illustrated. System 230 is shown in the context of a conference room like conference room 11 described above with respect to FIG. 1 where presentation units 48 and 232 are mounted on a rail 40 within the room for easy viewing of associated presentation surfaces by an audience. Here, master unit 28 is similar to the master unit 28 described above with respect to FIG. 1 with few differences. With respect to the differences, referring again to FIG. 3, master unit processor 80 in the FIG. 11 embodiment is programmed slightly differently than the processor described above with respect to FIG. 1. More specifically, because there is only one slave unit 232 in system 230, processor 80 is programmed to flip all images to single slave unit 232 when send commands are received.

Second, prior to flipping an image to slave unit 232, processor 80 is programmed to add an image identifier number to the flipped image which, in the example here, is added to the flipped image in the upper left hand corner. For example, in FIG. 11, image identifier numbers "6" and "7" are associated with images presented on surfaces 250 and 248, respectively, and therefore, identifier numbers 6 and 7 have been added to each of the images so that each image can be subsequently uniquely identified.

Third, prior to flipping an image to slave unit 232, processor 80 correlates and stores the image and the image identifier number in master unit memory 88 for subsequent access. In the above example illustrated in FIG. 11, master unit processor 80 (see again FIG. 3) stores the image on surface 250 with identifier number 6 and similarly stores the image on surface 248 with identifier number 7 when each of those images is flipped to slave unit 232.

Referring still to FIG. 11, slave presentation unit 232 is a large format printer or plotter that includes a subset of the components or a set of components akin to the components illustrated in FIG. 5. To this end, unit 232 includes a processor 336, a motor 338, a printer 340 and a large roll of paper 342 as well as a transceiver 240. In the case of unit 232, processor 336 is linked to motor 338, transceiver 240 and printer 340 and, when an image is flipped to unit 232, processor 336 controls motor 338 and printer 340 simultaneously to unroll a portion of the paper roll while applying ink to a front surface 250 thereof as the unrolled portion of the roll drops downward. In addition to applying the image to surface 250, printer 340 applies the image identifier number (e.g., "6" in FIG. 11) in the upper left hand corner of the image.

After an image is printed, the portion of the roll that was let out of unit 232 can be torn off and posted adjacent unit 232 for continuous viewing. To this end, in at least some embodiments, rail 40 may include a corkboard front surface so that tacks can be used to post torn sheets there along. In FIG. 11, an exemplary torn sheet 234 having the number "7" as an identifier number is illustrated as being posted to rail 40 adjacent unit 232. It is contemplated that perforated lines may be provided at spaced locations along the length of the paper roll so that sheets can be torn off in a clean fashion.

In the embodiment illustrated in FIG. 11, in order to re-present one of the images printed by slave unit 232 via master unit 28, referring to FIGS. 2 and 11, a system operator uses number pad 67 to select the number associated with the image to re-present and then selects retrieve key 62. For instance, to re-present the image on sheet 234 in FIG. 11, the operator selects number "7" and retrieve key 62. After key 62 is selected, referring once again to FIG. 3, master unit processor 80 accesses the image stored in memory 88 corresponding to image identifier number "7" and re-presents that image via display 48. Once the image is re-presented, the image may be modified and then re-flipped to slave unit 232 for printing and posting.

Figure 12:
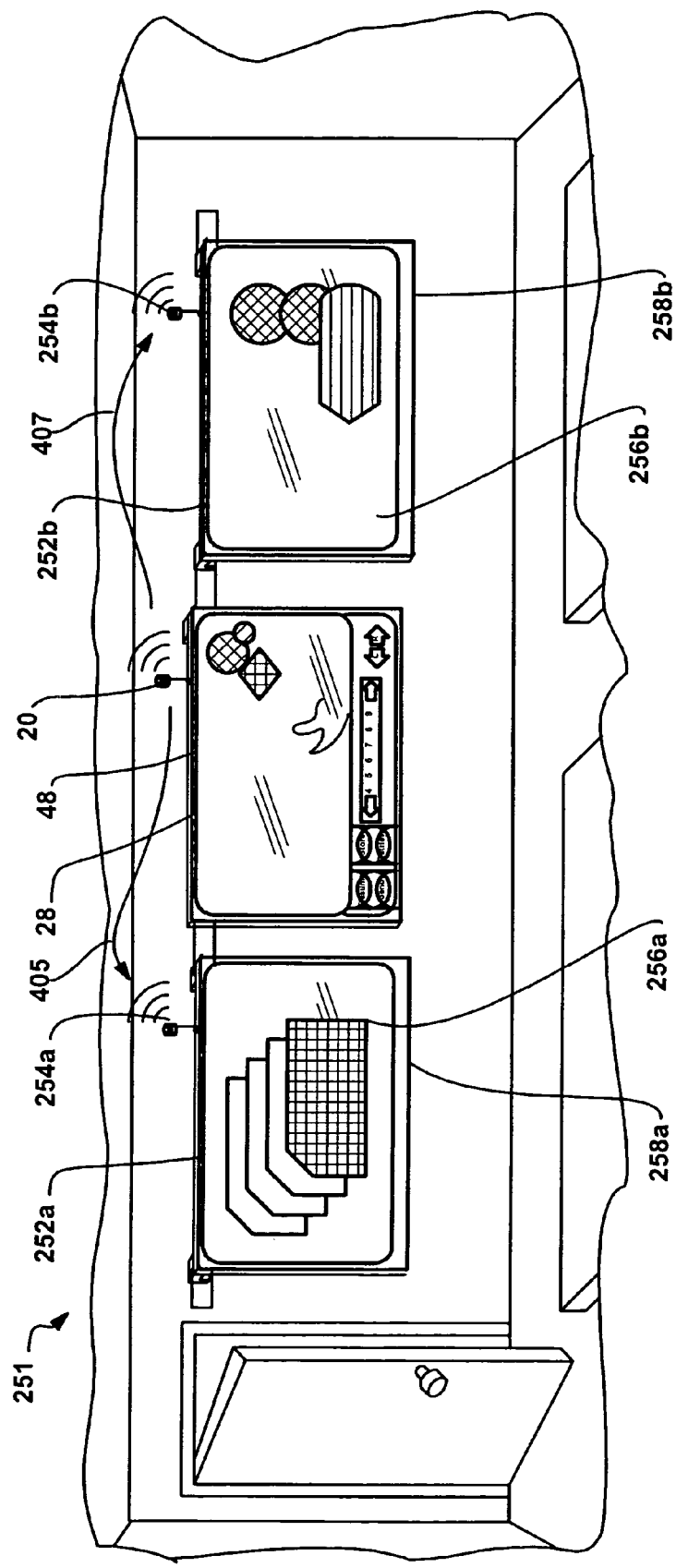
FIG. 12 is similar to FIG. 1, albeit illustrating slave presentation units that include flat panel displays.

Referring now to FIG. 12, yet one additional system 251 according to the present invention as illustrated. Here, the system 251 includes a master presentation unit 48 and first and second slave units 252*a* and 252*b*, respectively. In the illustrated embodiment, master unit 48 is mounted to a rail 40 between slave units 252*a* and 252*b* so that, when viewed from an audience's perspective, unit 252*a* is to the left of master unit 48 and unit 252*b* is to the right of master unit 48.

Master unit 48 is similar to the master units described above and therefore will not be described here in detail. Each of slave units 252*a* and 252*b* is similarly constructed and operates in a similar fashion and therefore, in the interest of simplifying this explanation, only unit 252*a* will be described in any detail. Unit 252*a* includes a hardened, generally recti-linear, plastic or metallic housing 258*a*, a transceiver 254*a* and a large format thin profile plasma, LCD or other thin profile display screen 256*a*. In addition, unit 252*a* also includes a processor and a memory linked thereto, neither of the processor nor memory illustrated. The slave processor is linked to display 256*a* and to slave transceiver 254*a* as well as to the slave memory.

Referring still to FIG. 12, when an image is flipped from unit 48 to slave unit 252*a*, the image is transmitted wirelessly to unit 252*a* and is immediately presented via display 256*a*. As in the above examples, when an image is flipped from unit 28, unit 28 is immediately blanked so as to mimic the flipping of a sheet on a conventional paper pad type flipchart. Here, when an image is flipped from master unit 28, the image and the slave unit to which the image has been flipped may be correlated and stored in either the master unit memory 88 or in the slave unit memory.

Where an image displayed via one of the slave units is to be retrieved and again displayed via master unit 28, the keyboard on unit 28 may be used to identify the slave unit from which the image is to be retrieved and then to perform the retrieval process. Once again, the retrieval process may be completely internal to unit 28 where the image presented by the slave unit is stored in master unit memory 88. In the alternative, where the slave image is stored in the slave unit memory, the retrieval process may require a retrieval request packet from master unit 28 to the slave unit (e.g., 252*a* in FIG. 12) to retrieve the image and then a second packet transmission from the slave unit back to master unit 28.

Figure 18:
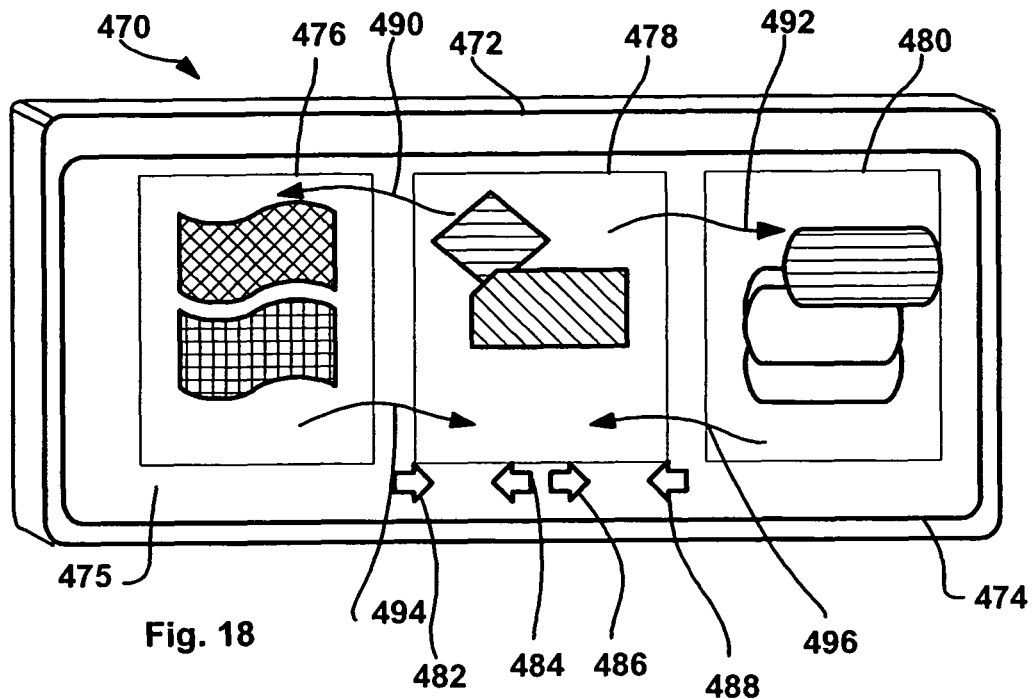
FIG. 18 is a plan view of a system consistent with certain aspects of the present invention including a single presentation unit that divides surface space into a plurality of presentation surfaces that can be used to mimic flip chart activity.

Referring now to FIG. 18, one additional system 470 consistent with at least some aspects of the present invention is illustrated. System 470 includes a single presentation unit (also referred to by numeral 470) that includes a display 474 mounted within a rigid housing assembly 472 so that a display surface 475 is observable to the audience. Here, surface 475 is generally divided into a plurality of sub-spaces for presentation purposes including adjacent spaces 476, 478 and 480. In at least some embodiments it is contemplated that there will be no mechanical delineators between presentation spaces 476, 478 and 480 and that, instead, those separate spaces will be recognizable as such only when information is presented on surface 475. Thus, for instance, system 470 may include a front projector unit (not illustrated) that projects images into each of presentation surface spaces 476, 478 and 480. In the alternative, unit 470 may be a flat panel plasma, LCD type display or other thin type display where separate images are presented via each of spaces 476, 478 and 480.

Referring still to FIG. 18, four touch sensitive directed arrow icons 482, 484, 486 and 488 are provided below presentation surface 478. Icon 484 is selectable to indicate that an image presented via surface 478 should be flipped left to surface 476 as indicated by arrow 490. Arrow icon 486 is selectable to indicate that an image presented via surface 478 should be flipped right to surface 480 as indicated by arrow 492. Similarly, arrow icon 482 is selectable to indicate that the image on left surface 476 should be retrieved and presented on surface 478 as indicated by arrow 494 and arrow icon 488 is selectable to indicate that an image on right surface 480 should be retrieved and presented on central surface 478 as indicated via arrow 496. In this case, it is contemplated that the central presentation surface 478 may be useable in the same way that the master units described above are useable to edit images and to flip the images to slave units and retrieve the images from slave units.

Figure 19:
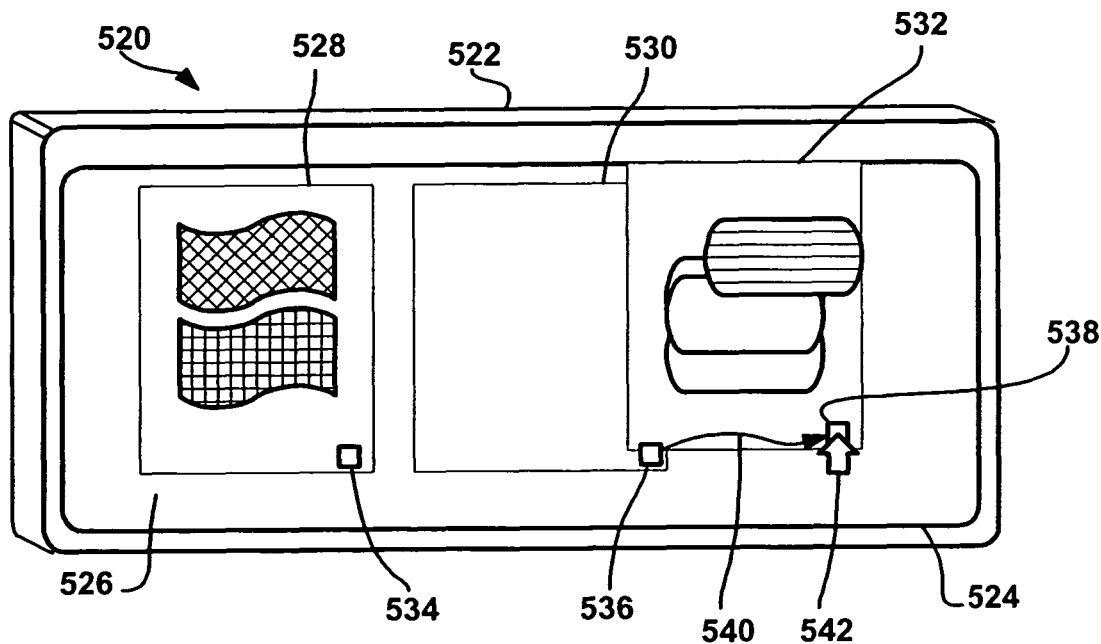
FIG. 19 is similar to FIG. 18, albeit illustrating a different system wherein presented images are managed in a different manner.

Referring to FIG. 19, a system 520 similar to the system of FIG. 18 is illustrated that includes a single presentation unit 522 that is an electronic, flat panel unit having a presentation screen 524 that forms a viewing surface 526. As in the case of the embodiment of FIG. 18, in FIG. 19 it is assumed that some type of sensor components (not illustrated) are provided to identify locations on surface 526 that are selected or indicated via a system operator (e.g., via a stylus, the users finger, etc.). In the case of system 520, it is contemplated that a master presentation space 530 may be represented on surface 526 in a visually distinct manner such as by placing a border or outline line therearound. In FIG. 19 master space 530 is illustrated as being located generally on the central part of surface 526. In some cases more elaborate visual graphics may be provided to distinguish master space 530. For instance, consistent with the desire to mimic a flip chart, space 530 may be distinguished via graphics that resemble a flip chart.

Referring still to FIG. 19, in some cases a control icon 536 is provided within master space 530 that can be used to flip images from master space 530 to other spaces on surface 526.

In the illustrated embodiment after an image has been formed in master space 530, a system operator can place the tip of a stylus in icon 536 to drag the image to another location on surface 526. Here, it is contemplated that when the image is dragged from master space 530, the master space and its visually distinguishing features will remain in their original positions on surface 526. In FIG. 19, one image previously flipped or dragged from master space 530 is labeled 528 and a second image being flipped from space 530 as indicated via arrow 540 is labeled 532. An arrow 542 represents the tip of a stylus used by the operator to perform the dragging process.

In at least some cases when images are dragged from space 530, control icons will move therewith so that the flipped images can be moved about surface 526 after flipping. In addition, in at least some embodiments, images previously flipped may be retrieved to master space 530 by selecting the control icon on the flipped image and dragging the selected icon back into master space 530. Here as in the previously described embodiments, software for master space editing and display of software screen shots are contemplated.

Figure 20:
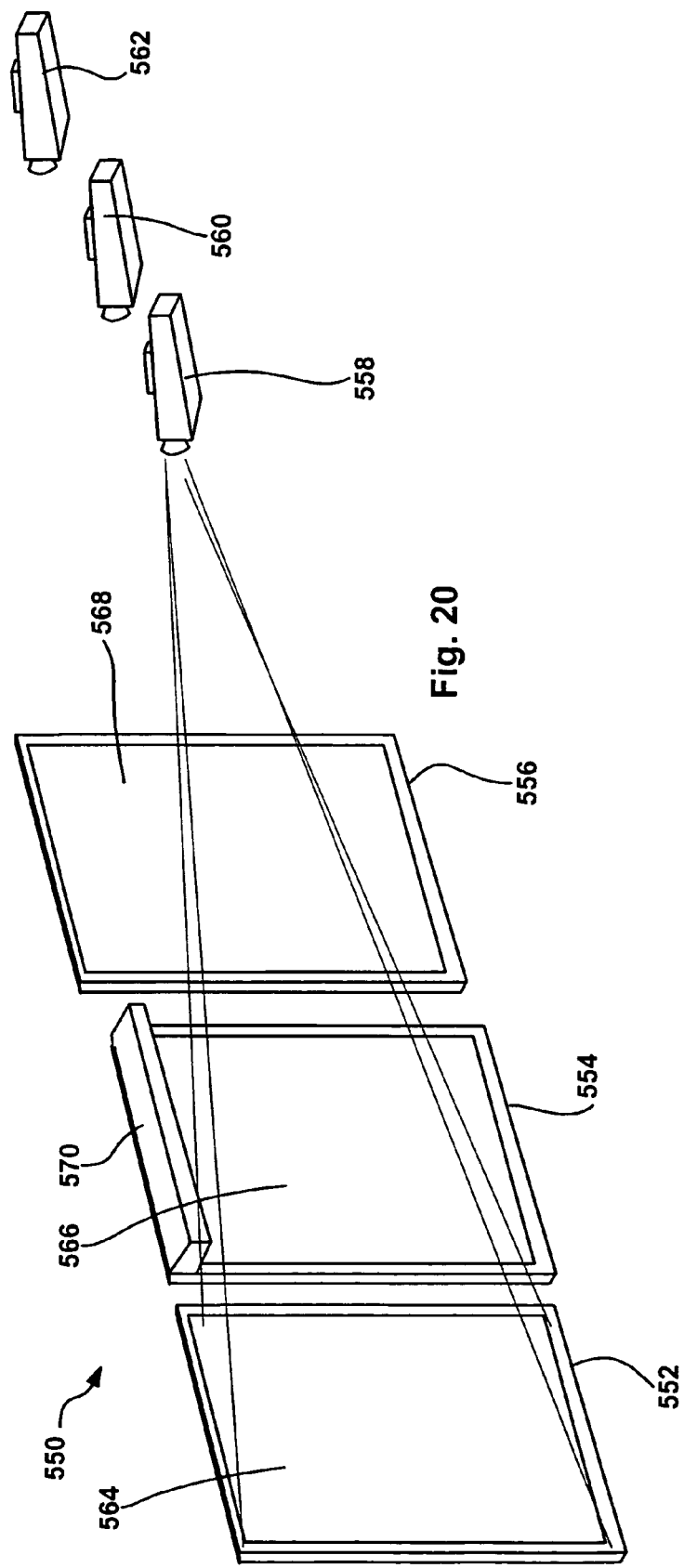
FIG. 20 is a perspective view of another inventive embodiment including three projectors and associated projection screens/assemblies.

Referring now to FIG. 20, another inventive embodiment 550 is illustrated that includes a master unit and two slave units. The master unit includes a master display screen or assembly 554 and a master front projector unit 560 while the first and second slave units include slave screen 552 and first slave projector unit 558 and second slave screen 556 and second slave projector unit 562, respectively. Screens 552, 554 and 556 include display projection surfaces 564, 566 and 568, respectively, that are all of similar dimensions and which would each be juxtaposed for simultaneous viewing by an audience or group participating in collaborative activities. In addition, master assembly 554 includes a laser sensor unit 570 mounted along a top edge of screen 554 for sensing positions of styluses, pens, erasers, etc., on or proximate surface 566.

In FIG. 20, projector units 558, 560 and 562 are positioned to project separate images on each of surfaces 564, 566 and 568. Master assembly 554 is linked to (not illustrated) or includes a processor akin to the processors described above for controlling images and system software generally and, more specifically, for controlling image flipping activity as well as retrieval of images back to master surface 566 for viewing and editing.

Figure 21:
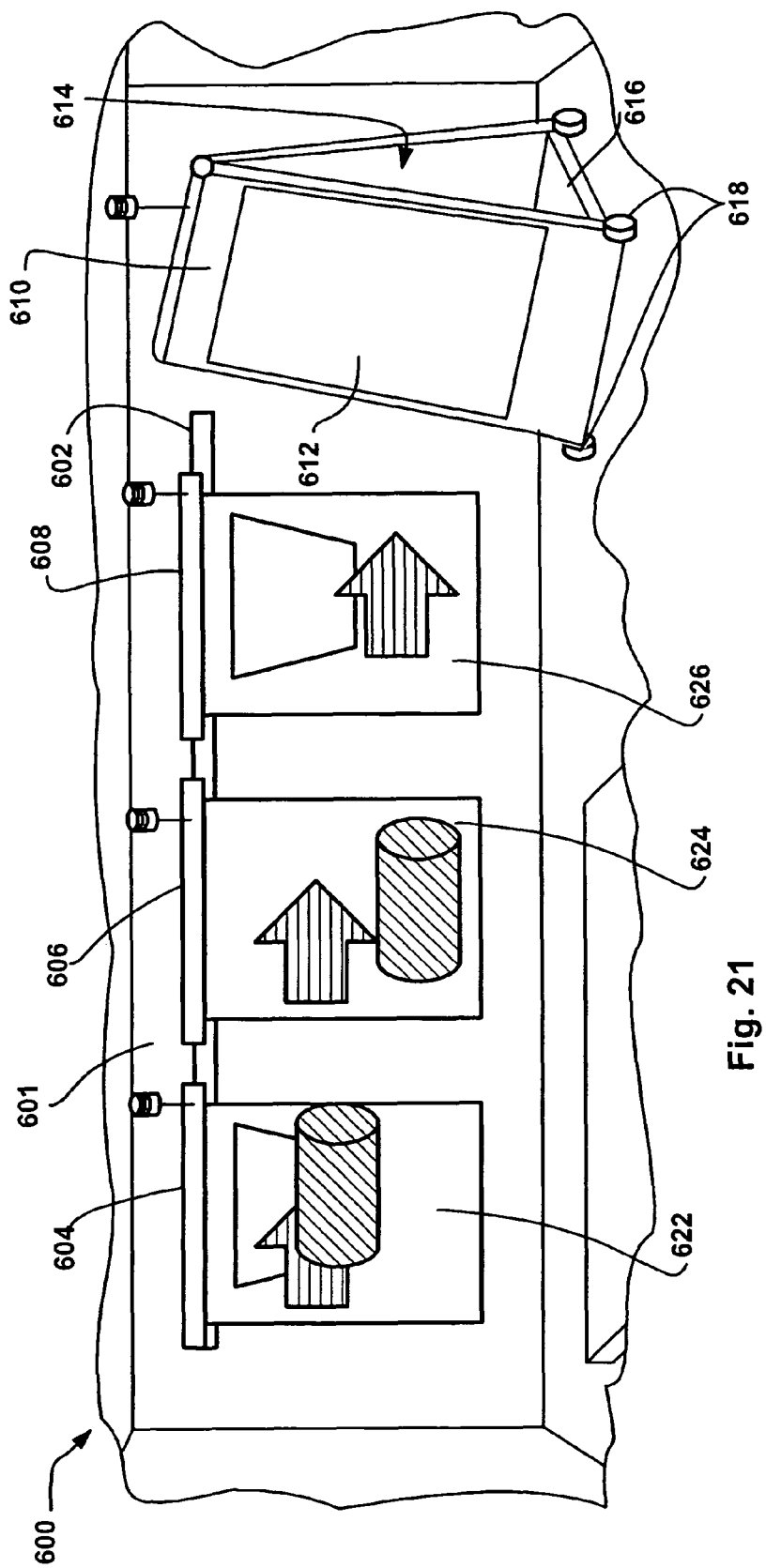
FIG. 21 illustrates yet another embodiment where a master unit is in the form of an easel assembly and slave units are wall mounted.

Referring to FIG. 21, another system 600 consistent with certain inventive aspects is illustrated. System 600 includes a master presentation unit 610 and three slave units 604, 606 and 608. Each of the slave units 604, 606 and 608 is similar to the slave units described above with respect to FIGS. 1, 4 and 5 and therefore are not described again here in detail. Here it should suffice to say that each slave unit 604, 606 and 608 is mounted to a wall 601 and more specifically via a wall mounted rail 602 and is capable of receiving images flipped thereto from master unit 610 and presenting received images via a slave presentation surface (i.e., surfaces 622, 624 and 626).

While each of units 604, 606 and 608 is wall mounted, master unit 610 is a portable floor supported easel type assembly including an easel structure (also identified via numeral 610) having an interior space 614 and one or more shelf members 616. In the illustrated embodiment casters 618 (only two labeled) are mounted at the bottom end of easel structure 610 to facilitate movement within a facility. A computer projector and other system components may be located on shelves 616 within space 614. Unit 610 includes a master presentation surface 612 for presenting master images, modifying the images and generally facilitating collaborative activity. As in the embodiments above, on-screen selectable icons may be provided via surface 612 for flipping master images to the slave units, to retrieve images and to perform other image management functions. Here, screen 612 may take any of several forms including a plasma screen, a rear projection screen where a rear projector is located within space 614, a front projection screen, etc.

Referring now to FIGS. 13 through 16, various methods and sub-methods consist of with certain aspects of the present invention are described. Each of the methods described herein may be used with at least one and in some cases more than one or even all of the systems described above or variations thereof.

Referring specifically to FIG. 13, a method 270 for flipping images from a master unit 28 to a slave unit is illustrated. Referring also to FIGS. 1-5, method 270 will be described in the context of system 10. Beginning at block 272, a system operator arranges the master unit and the slave presentation units or devices for viewing by an audience within room 11. At block 274, information is presented via master display 48. At block 276, processor 80 monitors input devices such as keyboard 30, wireless control signals generated via HHD 200, etc., for a command to flip an image currently presented via unit 28 to one of the slave presentation units 22a and 22b. At decision block 278, where no flip command is received, control loops back up the block 274 where the method described above is repeated. At block 278, after a flip command is received, control passes to block 280 where master unit 48 transmits the master image as part of an image data packet to the selected slave unit. At block 282, the selected slave unit presents the received image in any of the manners described above.

Referring now to FIG. 14, a sub-method 284 which may be used to replace blocks 280 and 282 in FIG. 13 is illustrated which correlates flipped images with image identifiers so that images can be subsequently re-accessed, re-presented and edited via master unit 28. To this end, sub-process 284 is to be used with systems that assign unique image identifiers to images generated by the slave units where the slave units then include (e.g., print) the image identifiers with the images when images are generated. Thus, sub-method 284 will described in the context of system 230 of FIG. 11.

Referring to FIGS. 2, 3, 11, 13 and 14, after a flip from master unit 28 to slave unit 232 has been commanded at block 278, control passes to block 286 in FIG. 14. At block 286, the master image is correlated with a unique image identifier number (e.g., "6" or "7" as illustrated in FIG. 11). At block 288, master processor 80 stores the correlated image and image identifier number in master memory 88. At block 290, master unit 28 transmits the master image to the selected slave unit. At block 292, the selected slave unit presents the transmitted image along with the image identifier number. Thus, for instance, in FIG. 11, slave unit 232 generates the image on surface 250 and adds the image identifier number "6" in the upper left hand corner. At this point the image flip has been completed.

Continuing, at block 294, after an image flip has been completed, master processor 80 monitors for a retrieval request for an image associated with a specific identifier number. For example, where identifier number "7" has been appended to an image on sheet 234 as indicated in FIG. 11, the system operator may request retrieval of the image on sheet 234 via entry of number "7" and selection of the retrieve key 62 (see again FIG. 2). At block 296, where no retrieval is requested, control loops back up through blocks 292 and 294. After a retrieve command is received at block 296, control passes to block 298 where master processor 80 accesses the image correlated with the identifier number entered by the operator and at block 300, master unit 28 re-presents the correlated image via master display 48.

Figure 15:
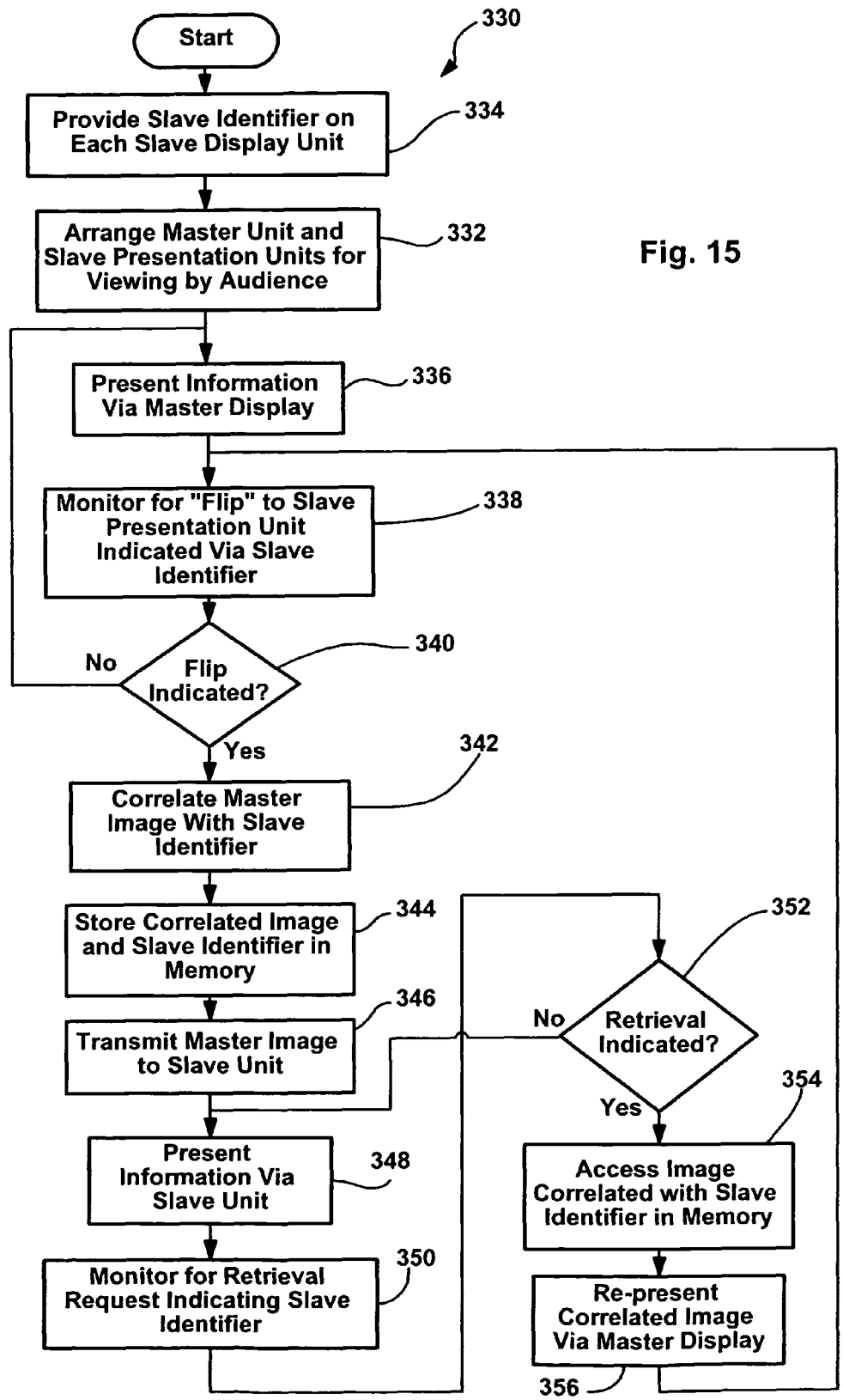
FIG. 15 is a method for flipping images from a master unit to a slave unit and thereafter retrieving an image from a slave unit where the slave unit is uniquely identifiable.

Referring now to FIG. 15, a method 330 for managing flipchart images where each of the slave units is identifiable by a unique slave unit identifier as is the case in the embodiment of FIG. 1 is illustrated. To this end, in FIG. 1, slave unit 22a can be uniquely identified by number "1" while unit 22b can be identified by number "2". Referring to FIGS. 1, 2, 3 and 15, at block 334, a slave identifier (e.g., 24a, 24b, etc.) is provided on each slave display device and the slave identifier is associated in some fashion with the wireless network address corresponding to the identifier on the slave device. The associated slave identifiers and network addresses are stored in master unit memory 88. At block 332, the master unit 28 and the slave presentation units 22a and 22b are arranged within room 11 for viewing by an audience.

At block 336, an image is presented and/or manipulated via master display 48. At block 338, master unit processor 80 monitors for a flip command indicating that the currently displayed image should be flipped to one of the slave presentation units. At block 340, where no flip is indicated, control passes back up and through blocks 336 and 338. Once a flip is indicated at block 340, control passes to block 342 where the master image is correlated with the slave identifier specified by the operator (i.e., the identity of the slave unit to which the image is to be flipped).

At block 344, master processor 80 stores the correlated image and slave identifier number in memory 88 and at block 346 master processor 80 transmits the master image to the slave unit. At block 348, the slave unit presents the received image.

At block 350, master processor 80 monitors for a retrieve request indicating a specific slave identifier associated with a slave unit from which an image should be retrieved. At block 352, if a retrieval command is not received, control passes back up to block 348 and the loop described above is repeated. At block 352, after a retrieval command is received, control passes to block 354 where processor 80 accesses the image correlated with the slave identifier in master memory 88. At block 356, processor 80 re-presents the correlated image via master display 48.

Figure 16:
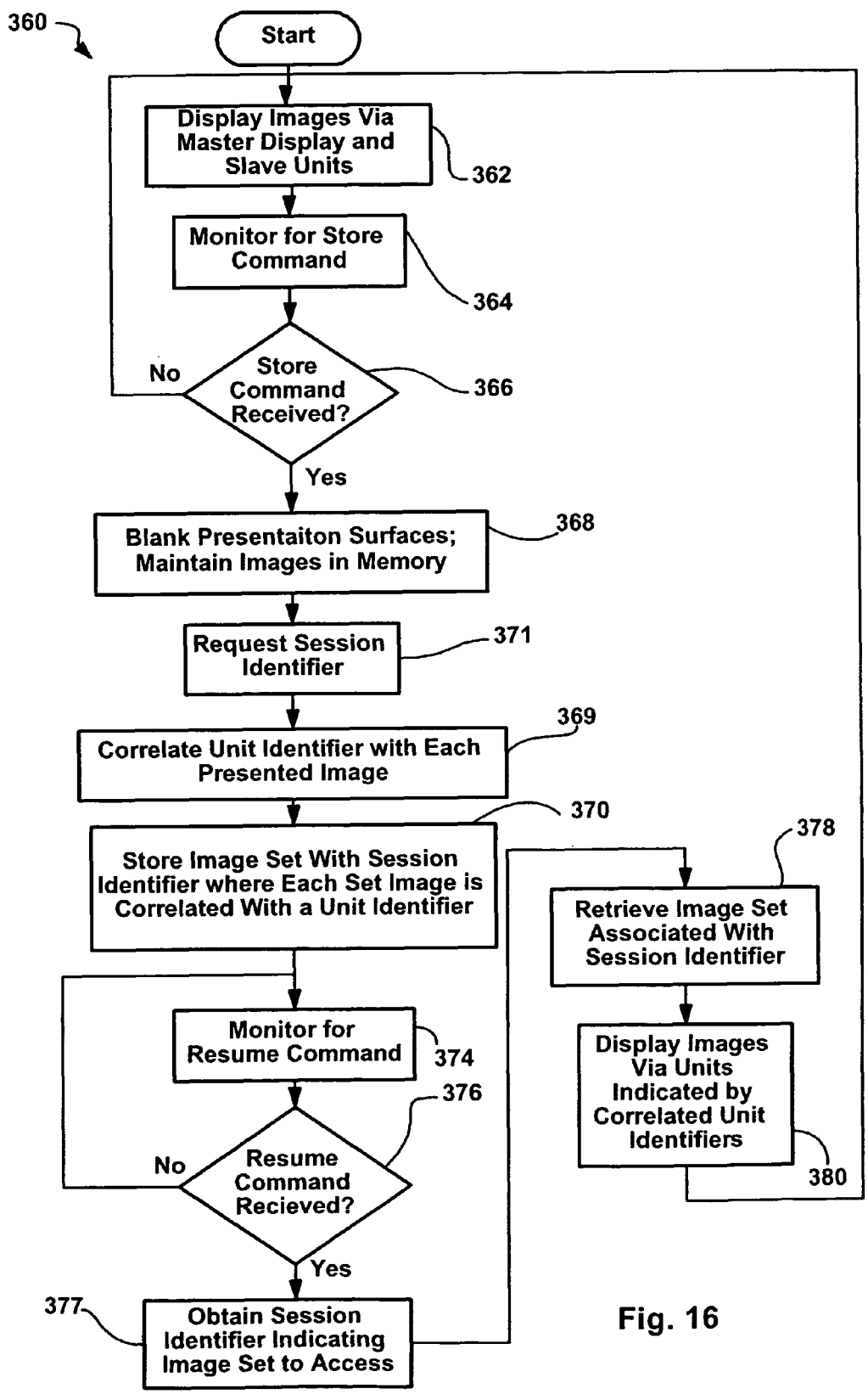
FIG. 16 is a flowchart illustrating a method whereby images currently displayed via a master presentation unit and slave presentation units may be quickly stored and subsequently re-accessed and re-presented via the same units on which the images were presented prior to being saved.

Referring now to FIG. 16, a method 360 that may be run by master unit processor 80 in parallel with any of the methods described above with respect to FIGS. 13 through 15 is illustrated. Method 360 is a method for correlating currently presented images with specific presentation units when a session store command is received, storing the correlated images and unit identifiers for subsequent access and then, when a resume command is received, for re-presenting the images via the presentation units associated therewith when the session store command was received. Thus, for instance, referring to FIG. 1, assume that during a collaborative session first, second and third images are presented via units 22a, 22b and master unit 28 when the store key 60 is selected, respectively. Here, upon selection of key 60, the first, second and third images are correlated with unit identifiers associated with units 22a, 22b and 28, respectively, the correlated data is stored in master memory 88 as an image set and then the presentation surfaces of units 22a, 22b and 28 are cleared. Subsequently, when an operator resumes the session corresponding to the stored image set, processor 28 flips the first and second images to slave units 22a and 22b, respectively, for presentation and presents the third image via display 48 so that the session can continue where the session left off.

Referring to FIGS. 1, 2, 3 and 16, at block 362, images are presented via master display 48 and each of slave units 22a and 22b. At block 364, processor 80 monitors for selection of store key 60. At block 366, where store key 60 has not been selected, control passes back up to block 362. Once store key 60 is selected at block 366, control passes to block 368 where processor 28 blanks master display 48 and transmits signals to each slave unit (e.g., 22a, 22b, etc.) causing each of the slave units to blank their respective presentation surfaces. Here, while the presentation surfaces are blanked, data corresponding to the images from the presentation surfaces is maintained in master memory 88 or a combination of master memory 88 and the slave memories (e.g., 119 in FIG. 5).

Continuing, at block 171 processor 80 requests a session identifier from the operator that can be subsequently used to access the session images. For instance, processor 80 may provide a session identifier field and a query prompting the operator to name the session image set via master display 48. Where a text session identifier is preferred, processor 80 may also provide touch selectable icons comprising a full alphabetical keyboard via display 48 or, in the alternative, may be capable of recognizing hand writing within the session identifier field. Instead of requesting a session identifier at block 171, processor 80 may simply assign a random access code to the session image set and temporarily provide the code to the operator via display 48.

At block 369, processor 80 correlates each image in the image set with a unique presentation unit identifier (i.e., an identifier that is unique to one of master unit 28 or one of the slave units (e.g., 22a, 22b, etc.). At block 370, master processor 80 stores the session image set with the session identifier where each of the images is associated with a specific one of the master unit and the slave unit identifiers in master memory 88. After block 370 all of the session images have been stored in an accessible format for future reference.

Next, at block 374, master processor 80 monitors for selection of resume icon 56 indicating that a previous collaborative session is to be resumed and therefore that a stored image set should be reaccessed and presented. At block 376, where no resume command is received, control passes back up to block 374. Once a resume command is received at block 376, control passes to block 377.

At block 377, master processor 80 provides a request prompting a system operator to provide a session identifier corresponding to a previously stored image set. Here, the prompt may include a text query and a session identifier field along with a suitable set of touch sensitive icons (e.g., numbers, alphanumeric, etc.) for specifying an identifier.

At block 378, the image set associated with an entered session identifier is retrieved from memory 88 and at block 380 the images in the set are displayed via the master display and the slave units so that the previous session can continue where it left off. After block 380, control passes back up to block 362 where the process described above continues.

In addition to being able to store sets of images that are simultaneously presented via the system presentation units for subsequent access, it is also contemplated that, in at least some embodiments of the present invention, separate images may be selectable for storage and subsequent access independent of whether or not the images are flipped to slave units. For example, referring once again to FIGS. 2 and 3, it at least some cases, master processor 80 may be programmed such that, when store key 60 is selected once, the image currently presented via display 48 is stored and, when key 60 is selected twice in rapid succession (e.g., an action akin to a double-click of a mouse), processor 80 is programmed to store an entire compliment of session images as an image set. Where single images are stored for subsequent access, in some cases those images may be added to a session set associated with the collaborative session occurring when the image is stored. In the alternative, in some cases, when a single image is stored, processor 80 may perform a process similar to the one described above with respect to storage of session image sets, requiring a specific text or numeric image identifier from the system operator that can be used to subsequently reaccess the image.

Where images are separately stored, referring still to FIGS. 2 and 3, when retrieve key 62 is selected, because images can be retrieved from either the master memory or from one of the slave presentation devices, processor 80 may provide a menu of options indicating the possible sources from which an image can be retrieved and suitable tools for accessing those images.

Figure 17:
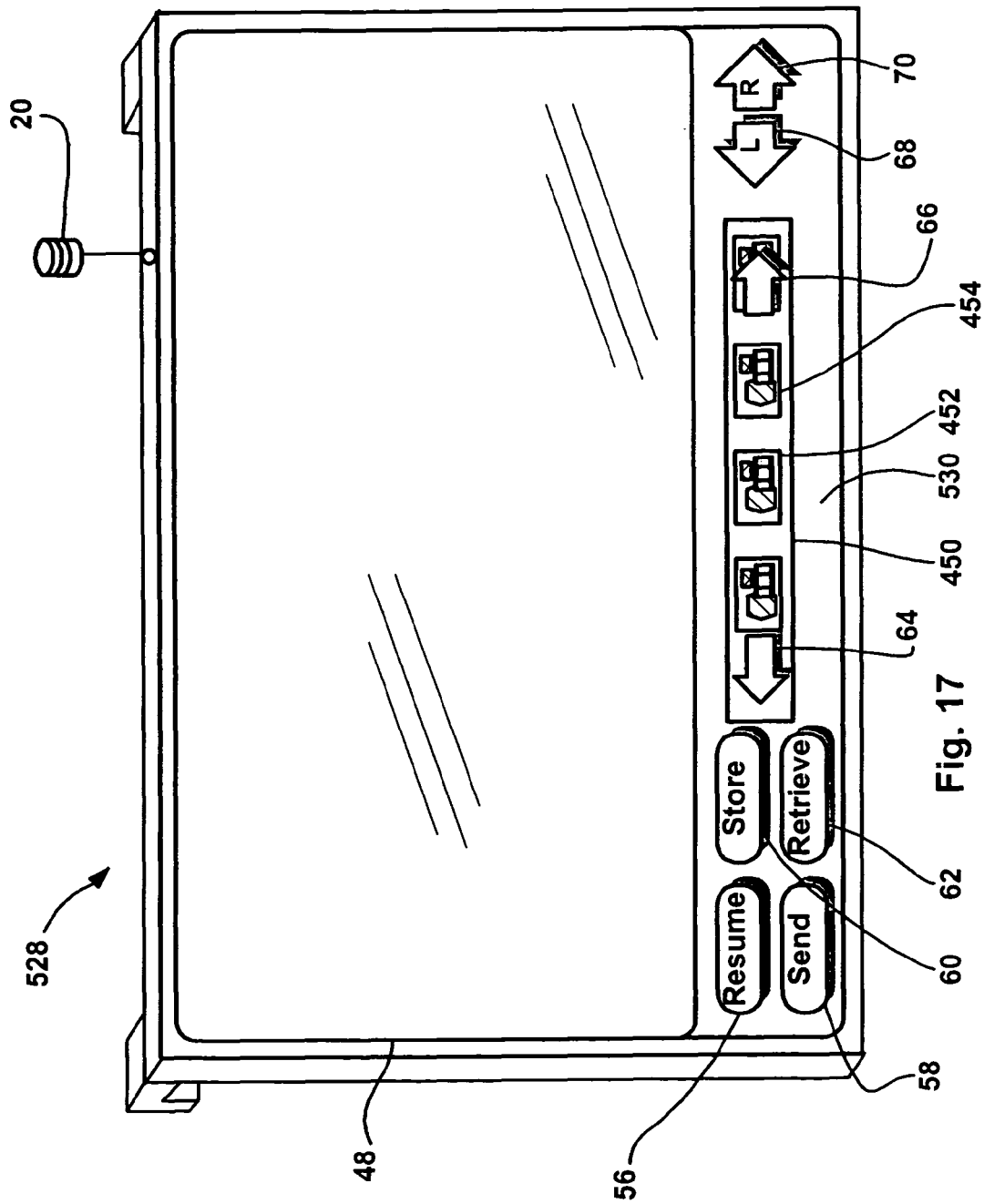
FIG. 17 is similar to FIG. 2, albeit illustrating a master unit that includes a different compliment of control buttons.

Referring to FIG. 17, a master presentation unit 528 similar to the master unit 28 of FIG. 2 is illustrated where the master unit 528 provides a set of touch sensitive icons in a lower margin area 530. Here, the resume icon 56, send icon 58, store icon 60 and retrieve icon 62 as well as the left and right flip icons 68 and 70, respectively, have functions that mirror the functions described above with respect to the similarly numbered keys in FIG. 2 and therefore, in the interest of simplifying this explanation, will not be described again here in detail. The main difference between the icon set provided via unit 528 and the key set provided via unit 28 is that the number pad 67 in FIG. 2 has been replaced by a thumb nail sketch bar 450 in FIG. 17. Here, it is contemplated that, whenever an image is flipped from master unit 528 to one of the slave units, a thumb nail of the flipped image will be presented via bar 450. In FIG. 17, two exemplary thumb nail sketches are identified by numerals 452 and 454. Here, to re-present an image via master display 48 that is being presented by one of the slave units, instead of identifying the specific slave unit or an image identifier that has been applied to an image to access the image, the system operator can simply select one of the thumb nail sketches (e.g., 452, 454, etc.) and retrieve icons 62 to re-present the image via display 48.

In at least some cases, it is contemplated that all images flipped from master unit 528 to any of the slave units are stored and maintained within the master memory 88 until a system operator terminates a collaborative session and corresponding thumb nail sketches (e.g., 452, 454, etc.) are added to bar 450. Here, where the number of flipped images exceeds the number of slave presentation units which is often the case during prolonged collaborative sessions, the system operator will still be able to quickly and easily access all flipped images independent of whether or not the images are currently presented via slave units or are simply stored in the master memory. Icons 64 and 66 are left and right scrolling icons that enable the operator to graphically search a large number of thumbnail sketches for specific images to re-present. In some cases it is contemplated that all flipped images and all stored images that are not flipped will be stored in master memory 88 and represented as selectable thumbnail sketches in bar 450.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims. For example, master unit 28 may simply be a conventional whiteboard equipped with a camera wherein, when an image is flipped from the master unit to one of the slave units, the camera takes a picture of the image presented via the master unit and transmits that image to a selected slave unit for presentation.

In addition, while all of the presentation units described herein include mounting members that mount the presentation units to a wall mounted rail, it should be appreciated that other types of support structures for the presentation units are contemplated. For instance, master unit 28 may be supported by an easel type assembly or may be a cart mounted assembly where the cart includes casters to facilitate easy movement of the unit within a facility.

Moreover, while a simple eraser and printer are described above, it should be appreciated that various types of printers and erasers are contemplated and may be used with the various embodiments of the present invention. For instances, in some cases, slave presentation surfaces may be provided by rigid whiteboard member and the printers described above may be plotters that move along the presentation surface or relative thereto (i.e., the rigid whiteboards may in fact be moved with respect to the plotters) and the eraser may be supported and moved in a similar fashion to provide images on the presentation surface and to erase images therefrom.

Furthermore, both the slave and master presentation units may be supported in any fashion including permanent wall mounts, easel type support structures with or without casters to facilitate movement, ceiling mounts, structure that secures the units to partition walls, etc.

While systems described herein include only two slave units, it should be appreciated that some systems will include three or more slave units. In addition, some systems may include more than one type of slave unit. For instance, referring again to FIGS. 11 and 12, a printer type slave unit like unit 232 may be added to the system 251 of FIG. 12 so that the system includes the printer 232 as well as flat panel units 252a and 252b. Other slave unit combinations are contemplated.

In at least some cases all of the system units (e.g., the master and slave units) may have identical constructions and functionality so that images can be edited via any of the units and can be flipped from or retrieved to any of the units. Thus, for instance, where three units like master unit 28 comprise a system, an operator may move among the units editing and flipping and retrieving in an enhanced collaborative fashion.

In addition, while one simple rail 40 configuration is described above, the invention contemplates many different types of rail configurations including other hook to hook type rails, rails that may receive wheels mounted on the master and slave units, rails that are only mountable via the ends thereof (e.g., the rail may restrict removal of mounted units via upward or forward motion—this is particularly important in cases where the units are relatively expensive) and other system where the units include securing structure to more effectively secure the units to the rail members 40.

Although not illustrated it is contemplated that, in addition to the components above, the system may also include a standard sized printer (e.g., 8½"×11", legal size, etc.) for printing copies of displayed images for meeting attendants to use during a meeting or to take from the meeting.

Figure 22:
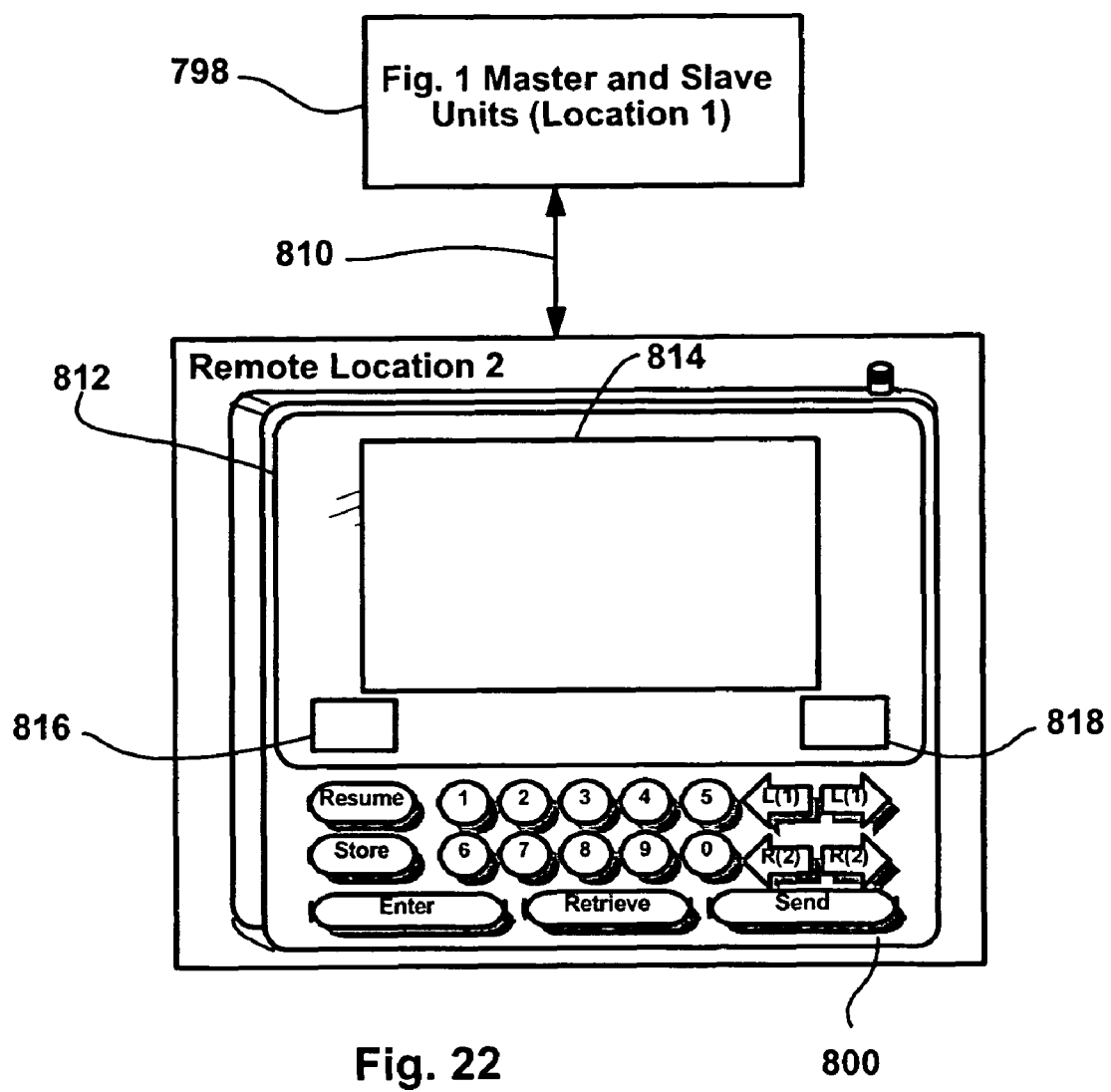
FIG. 22 is a schematic illustrating a system where an interface unit is used to remotely control a presentation using remotely located master and slave units.

Moreover, referring to FIGS. 1 and 22, in at least some cases, it is contemplated that one or all of the master and slave units 28, 221, 22b, may be located remotely 798 from a presenter using a laptop or personal computer to control master and slave units and the images presented thereon. Here, for instance, if a presenter in Chicago makes a mark on a Chicago based unit 800 display, the mark may be immediately provided on a master unit 28 (see again FIG. 1) located in a New York conference room. Here, if the user indicates that the master image should be flipped to the first slave unit 22a, the image in New York is flipped to the first slave unit 22a in New York. Similarly, images from the New York located slave units may be retrieved to the master unit 28 for editing via commands entered in Chicago. In the case described above, referring to FIG. 22, the remote control unit 200 (see again FIG. 10a) communicates via a network link 810 (e.g., the Internet) with the master unit 28 to drive the New York based presentation.

In some cases unit 800 may include representations of each of the master and slave unit images to help the presenter keep track of the remote presentation. To this end display 812 in FIG. 22 includes a master unit image box 814 and first and second slave unit image thumbnail sketches 816 and 818. In this case flipping and retrieving may be as simple as dragging images from one box or sketch or the other. For instance, to flip to the first slave unit 22a, a presenter may simply drag the master image in box 814 to thumbnail 816. Similarly, to retrieve the second slave unit image, the user may simply drag the second slave unit thumbnail 818 to the master box 814. This feature may also be used in the context of a unit 800 to control master and slave images locally (i.e., with unit 800 in the same space as the presentation units).

In some cases the master unit 28 and sub-set of the slave units 22a, 22b may be located in Chicago while one or more slave units are remotely located in New York. Here the presenter could control the flipping process to the different slave units in a manner similar to that described above.

To apprise the public of the scope of this invention, the following claims are made:

What is claimed is:

1. A presentation system for presenting information to an audience within a space, the system comprising:
   a communication network;
   a control interface;
   a master presentation unit including a processor and a master display screen, the master screen juxtaposed within the space so as to be viewable by the audience within the space, the processor operable to transmit an image displayed on the master screen upon user command issued via the control interface; and
   at least a first slave presentation unit including a first slave image presenter operable to receive and present images that are transmitted by the master unit to the first slave unit over the network to the audience within the space;
   wherein, when an image is transmitted from the master unit to a slave unit, the image is correlated with a slave unit identifier and is stored in a memory as an image-unit set persistently until the image is no longer presented via the slave presentation unit.

2. The system of claim 1 further including at least a second slave presentation unit including a second slave image presenter operable to receive and present images to the audience within the space that are transmitted by the master unit to the second slave unit over the network.

3. The system of claim 2 wherein the control interface is useable to indicate when an image presented on the master screen is to be transmitted to one of the slave units and also for indicating which of the slave units the image should be transmitted to.

4. The system of claim 3 wherein the master unit provides at least two buttons that are selectable by a system user to indicate which of the slave units to which an image presented on the master screen is to be transmitted.

5. The system of claim 4 wherein, after an indication is received that an image is to be transmitted to a slave unit, the processor removes the image to be transmitted from the master display.

6. The system of claim 2 wherein each of the slave presentation units includes a slave presentation surface for presenting images transmitted thereto.

7. The system of claim 6 wherein the scale of each of the presentation surfaces is substantially similar to the scale of the master display screen.

8. The system of claim 1 further including an augment interface by which a presenter may augment an image presented on the master screen.

9. The system of claim 8 wherein the augment interface senses when a system user performs an activity intended to touch the master screen and performs an associated activity.

10. The system of claim 9 wherein the associated activity includes one of adding information to the screen and erasing information from the screen.

11. The system of claim 1 wherein the slave image presenter includes a large scale printer assembly having a roll member, a print applicator and a motivator, the applicator generating images transmitted to the slave unit on a presentation surface of the roll member and the motivator unrolling the roll member so that the presentation surface is viewable by the audience within the space.

12. The system of claim 11 wherein the roll member includes a sheet of paper.

13. The system of claim 12 wherein the scale of the image printed via the print applicator is substantially similar to the scale of the image presented on the master display.

14. The system of claim 13 wherein the master display screen has display width and display height dimensions, the paper has a paper width dimension substantially similar to the display width dimension and wherein the motivator unrolls the roll such that a paper length unrolled is substantially similar to the display height dimension.

15. The system of claim 11 wherein, when the applicator generates an image, a unique identifier is applied proximate the printed image and the processor stores the printed image along with the unique identifier as an identifier-image set.

16. The system of claim 15 wherein, after at least one identifier-image set is stored, the processor monitors the control interface for a retrieve indication that the image associated with a unique identifier is to be retrieved and, when a retrieve indication is received, the processor accesses the identifier-image set corresponding to the identifier indicated by the retrieve indication and presents the image associated with the accessed identifier-image set via the master screen.

17. The system of claim 11 wherein the presentation surface is an erasable surface and wherein the applicator applies erasable ink to the presentation surface.

18. The system of claim 17 further including an eraser assembly for, when a new image is transmitted to the slave unit while an existing image is presented on the presentation surface, erasing at least a portion of the existing image prior to generating the new image on presentation surface.

19. The system of claim 1 wherein, when an image is transmitted to the slave unit, the processor erases the image from the master screen.

20. The system of claim 1 wherein the master unit includes the control interface.

21. The system of claim 20 further including an augment interface by which a presenter may augment images presented on the master screen.

22. The system of claim 21 wherein the augment interface includes an assembly for identifying interactive activity on the master screen.

23. The system of claim 1 wherein the control interface is separate from the master unit.

24. The system of claim 23 wherein the control interface is a hand held device and wherein the control interface communicates with the master unit via wireless communication.

25. The system of claim 23 wherein the control interface includes a display and wherein information presented via the master screen is identical to the information presented via the control interface display.

26. The system of claim 25 wherein edits to information on the control interface are immediately observable by the audience via the master display screen.

27. The system of claim 1 wherein the communication network includes a wireless communication system.

28. The system of claim 27 wherein the master unit includes a wireless transmitter and the slave unit includes a wireless receiver.

29. The system of claim 1 wherein the control interface is further useable to indicate when an image presented via a slave presenter should be displayed on the master screen and the processor displays the image that is presented via the slave information presenter via the master screen when such an indication is received, wherein, the indication that an image presented via a slave presenter should be displayed via the master screen specifies the identifier of the specific slave unit presenting the image to be displayed on the master screen, when the indication is received, the processor using the slave unit specified by the indication to access the image in a specific image-unit set to be displayed by the master.

30. The system of claim 29 wherein at least one of the master unit and the slave unit includes the memory.

31. The system of claim 1 wherein the control interface includes a store function whereby, when the store function is selected, the processor identifies the images currently presented on the master screen and the slave presenter, correlates the identified images with the presenting units and stores the correlated images and units as image unit sets for subsequent access and subsequent simultaneous presentation.

32. The system of claim 31 wherein, when the store function is selected, all of the images on the master screen and the slave presenter are erased from the respective presenters.

33. The system of claim 1 wherein each of the master unit and the slave units includes a presentation surface that is substantially vertically oriented.

34. The system of claim 33 wherein each of the master screen and the presentation surfaces has a width dimension that is greater than two feet and has a height dimension that is greater than two feet.

35. The system of claim 1 wherein the slave presenter presents images adjacent the master screen.

36. The system of claim 1 wherein each of the slave units includes a pull-out window shade style roller surface member that is reversibly extendable.

37. The system of claim 1 wherein each of the slave units includes a pull-out accordion style roller surface member that is reversibly extendable.

38. The system of claim 1 wherein each of the slave units includes a pull-out endless loop style roller surface member that is reversibly extendable.

39. The system of claim 1 wherein each of the slave units includes a pull-out drop-loop style roller surface member that is reversibly extendable.

40. The system of claim 1 wherein each of the slave units is wall mounted and wherein the master unit is floor supported.

41. A presentation system for presenting information to an audience within a space, the system comprising:
a communication network; and
a plurality of presentation units, each presentation unit positioned to present images to the audience within the space, at least one of the presentation units being a master unit including a processor and a display screen, the processor operable to transmit images displayed on the display screen over the network to another one of the presentation units upon user command, each of the other presentation units operable to receive and present images to the audience within the space that are transmitted by the master unit to the other unit over the network;
wherein, when an image is transmitted form the master unit to one of the other units, the image is stored in a memory that associates the image with a unique identifier persistently until the image is no longer presented via the slave presentation unit.

42. The system of claim 41 wherein each of the other presentation units includes a presentation surface on which the images are presented and wherein each of the screen and presentation surfaces has substantially similar dimensions.

43. The system of claim 42 wherein height and width dimensions of each of the screen and the presentation units are greater than two feet and two feet, respectively.

44. The system of claim 42 wherein each of the screen and the presentation surfaces is substantially vertically oriented.

45. The system of claim 41 wherein the unique identifier is a unique image identifier.

46. The system of claim 45 wherein, when one of the other units presents an image transmitted thereto by the master unit, the unique image identifier is indicated in a manner that associates the image identifier with the presented image.

47. The system of claim 46 wherein the identifier is indicated by presenting the identifier with the presented image.

48. The system of claim 41 wherein the stored image is re-accessible and re-presentable via the master unit by specifying the unique image identifier associated therewith.

49. The system of claim 41 wherein the user command indicates a specific one of the other presentation units to which the image is to be transmitted and wherein the unit identifier is a unique presentation unit identifier indicating the other presentation unit to which the image on the master screen is to be transmitted.

50. The system of claim 49 wherein each of the other units is associated with a specific unit identifier and wherein the unit identifiers are presented by each of the other units in a manner that is observable by the system user.

51. The system of claim 50 wherein the unit identifiers are printed on each of the other units.

52. A method for use with a plurality of image presenting units within a space wherein each of the presenting units is positioned so that an audience within the space can observe images presented by the unit, the method for managing presented images and comprising the steps of:
providing a control interface;
presenting images via each of the presenting units, the image presented by each of the presenting units being a unit specific image;
monitoring the control interface for an indication that the presented images should be stored;
when an indication is received that the presented images should be stored:
for each presenting unit, correlating the unit specific image presented with a unit identifier to form an image-unit set; and
storing the image-unit sets for all of the units as a session image set.

53. The method of claim 52 further including the step of, when an indication is received that the presented images are to be stored, erasing the unit specific images from the presenting units.

54. The method of claim 52 further including the step of, at a subsequent time, monitoring the control interface for a resume command and, when a resume command is received, accessing the stored session image set and presenting the unit specific images in each image-unit set via the unit indicated in the associated image-unit set.

55. The method of claim 52 wherein, when an indication is received that the presented images should be stored, the method further includes the steps of, prior to storing the session image set, assigning a session identifier to the session image set and storing the set along with the session identifier.

56. The method of claim 55 wherein the step of assigning includes assigning a random identifier to the session and presenting the random identifier via one of the presenting units.

57. The method of claim 55 wherein the step of assigning includes receiving a session identifier from a system user.

58. The method of claim 55 further including the step of, at a subsequent time, monitoring the control interface for a resume command and, when a resume command is received, monitoring for a session identifier and, when a session identifier is received, accessing the stored session image set associated with the received session identifier and presenting the unit specific images in each image-unit set in the session set via the unit indicated in the associated image-unit set.

59. A method for use with a master presentation unit, at least a first slave presentation unit, a communication network and a control interface, the master unit including a processor and a master display screen and the slave unit including a slave presenter, the method for presenting images to an audience within a space, the method comprising the steps of:
  locating the master display screen within the space so as to be viewable by the audience within the space;
  locating the slave presenter within the space so that an image generated thereby will be viewable by the audience within the space;
  monitoring the control interface for an indication that an image presented on the master screen should be presented via the slave presenter;
  when an indication is received that the image presented on the master screen should be presented via the slave presenter, transmitting the image presented on the master screen to the slave unit for presentation via the communication network; and
  after an indication that an image presented on the master screen should be presented via the slave presenter, storing the image in a memory that associates the image with a unique identifier persistently until the image is no longer presented via the slave presentation unit.

60. The method of claim 59 further including the step of, after transmitting to the slave unit, presenting the transmitted image via the slave presenter.

61. The method of claim 60 further including the step of, after an indication is received that the image presented on the master screen should be presented via the slave presenter, rendering the image on the master screen unobservable.

62. The method of claim 60 also for use with at least a second slave presentation unit including a second slave presenter, the control interface useable to indicate a specific one of the slave presenters to which an image presented via the master presenter is to be transmitted, the method further including the step of, when an indication is received to transmit the image from the master unit, determining which of the slave units to which to transmit the master image.

63. The method of claim 59 wherein the control interface is useable to augment images presented on the master screen and, wherein, the method further includes monitoring the interface for augmenting activity and, when augmenting activity is identified, augmenting the master image accordingly.

64. The method of claim 59 wherein the unique identifier is a unique image identifier.

65. The method of claim 64 further including the step of, after transmitting to the slave unit, presenting the transmitted image via the slave presenter and, wherein, the method further includes the steps of, when the slave unit presents an image transmitted thereto by the master unit, the slave unit indicates the unique image identifier in a manner that associates the image identifier with the presented image.

66. The method of claim 65 wherein the identifier is indicated by presenting the identifier with the presented image.

67. The method of claim 59 further including the steps of, after an image is stored, monitoring the interface for an indication that the image associated with the unique identifier should be re-accessed and re-presented via the master screen and, when an indication to re-present is received, presenting the image via the master screen.

68. The method of claim 67 wherein, when an image presented via the slave presenter is re-presented via the master screen, the image is rendered unobservable via the slave unit.

69. The method of claim 59 wherein the step of monitoring the input interface for an indication that an image presented on the master screen should be presented via the slave presenter includes monitoring for a command indicating a specific one of the slave units to which the image is to be transmitted and wherein the unique identifier is a unique presentation unit identifier indicating the slave unit to which the image on the master screen is to be transmitted.

70. The system of claim 69 wherein each of the slave units is associated with a specific unit identifier and wherein each of the slave units presents its identifier in a manner that is observable by the system user.

71. The system of claim 70 wherein the unit identifier associated with each of the slave units is printed on the associated slave unit.

72. The method of claim 59 further including the step of monitoring the interface for a store indication indicating that images currently presented on the master screen and the slave presenter are to be stored for subsequent use and, when a store indication is received, identifying the images currently presented on the master screen and the slave presenter, correlating the identified images with the presenting units presenting the images and storing the correlated images and units as image-unit sets.

73. The system of claim 72 wherein, when the store indication is received, the method includes erasing all of the images on the master screen and the slave presenter.

74. The method of claim 73 further including the steps of monitoring the interface for a resume indication indicating that previously stored images are to be re-presented, when a resume indication is received, accessing the image-unit sets and presenting the accessed images via the associated units as specified by the image-unit sets.

75. A presentation system for presenting information to an audience within a space, system comprising:
  a communication network;
  a control interface;
  a master presentation unit including a processor and a master display screen, the master screen juxtaposed within the space so as to be viewable by the audience within the space;
  at least a first slave presentation unit including a first slave image presenter operable to receive and present images that are transmitted by the master unit to the first slave unit over the network to the audience within the space; and
  the processor operable to transmit an image displayed on the master screen over the network upon user command via the control interface to the first slave unit;
  wherein, when an image is transmitted from the master unit to a slave unit, the image is correlated with a slave unit identifier and is stored in a memory as an image-unit set persistently until the image is no longer presented via the slave presentation unit.

76. The system of claim 75 further including at least a second slave presentation unit including a second slave image presenter operable to receive and present images to the audience within the space that are transmitted by the processor to the second slave unit over the network.

77. The system of claim 76 wherein the control interface is useable to an image presented on the master screen is to be transmitted to one of the slave units and also for indicating which of the slave units the image should be transmitted to.

78. The system of claim 77 wherein the control interface provides at least two buttons that are selectable by a system user to indicate which of the slave units to which an image presented on the master screen is to be transmitted.

79. The system of claim 78 wherein, after an indication is received that an image is to be transmitted to a slave unit, the processor removes the image to be transmitted from the master display.

80. The system of claim 75 further including an augment interface by which a presenter may augment an image presented on the master screen.

81. The system of claim 80 wherein the augment interface senses when a system user performs an activity intended to interact with the master screen and performs an associated activity.

82. The system of claim 75 wherein, when an image is transmitted to the slave unit, the processor erases the image from the master screen.

83. The system of claim 75 wherein the master unit includes the control the processor.

84. The system of claim 75 wherein the control interface and processor are the master unit.

85. The system of claim 84 wherein the control interface is a hand held the processor and wherein the control interface communicates with the master unit via wireless communication.

86. The system of claim 85 wherein the control interface includes a display and wherein information presented via the master screen is identical to the information presented via at least a portion of the control interface display.

87. The system of claim 86 wherein edits to information on the control interface are immediately observable by the audience via the master display screen.

88. The system of claim 75 wherein the communication network includes a wireless communication system.

89. The system of claim 75 wherein, the indication that an image presented via a slave presenter should be displayed via the master screen specifies the identifier of the specific slave unit presenting the image to be displayed on the master screen, when the indication is received, the processor using the slave unit specified by the indication to access the image in a specific image-unit set to be displayed by the master.

* * * * *